US009146927B2

(12) United States Patent
Hirai et al.

(10) Patent No.: US 9,146,927 B2
(45) Date of Patent: Sep. 29, 2015

(54) DATA PROCESSING APPARATUS, DATA PROCESSING METHOD, AND PROGRAM

(75) Inventors: Norio Hirai, Tokyo (JP); Mitsunori Kori, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 93 days.

(21) Appl. No.: 13/805,123

(22) PCT Filed: Jun. 18, 2010

(86) PCT No.: PCT/JP2010/060352
§ 371 (c)(1),
(2), (4) Date: Dec. 18, 2012

(87) PCT Pub. No.: WO2011/158372
PCT Pub. Date: Dec. 22, 2011

(65) Prior Publication Data
US 2013/0103643 A1  Apr. 25, 2013

(51) Int. Cl.
*G06F 17/30* (2006.01)
(52) U.S. Cl.
CPC ...... *G06F 17/3007* (2013.01); *G06F 17/30076* (2013.01); *G06F 17/30286* (2013.01); *G06F 17/30598* (2013.01)
(58) Field of Classification Search
CPC .................... G06F 17/30598; G06F 17/30076
USPC .................................................. 707/609, 737
See application file for complete search history.

(56) References Cited

U.S. PATENT DOCUMENTS

| 5,734,706 | A | * | 3/1998 | Windsor et al. | 379/142.01 |
| 5,812,826 | A | * | 9/1998 | McLain, Jr. | 703/27 |
| 6,038,564 | A | * | 3/2000 | Sameshima et al. | 707/702 |
| 6,574,246 | B1 | * | 6/2003 | Crosby | 370/516 |
| 7,193,972 | B1 | * | 3/2007 | Nakamura et al. | 370/252 |
| 7,271,765 | B2 | * | 9/2007 | Stilp et al. | 342/457 |

(Continued)

FOREIGN PATENT DOCUMENTS

CN  101738218 A  6/2010
JP  6 180716  6/1994

(Continued)

OTHER PUBLICATIONS

Office Action issued Nov. 19, 2013 in Japanese Patent Application No. 2012-520228 (with partial English language translation).

(Continued)

*Primary Examiner* — Jean M Corrielus
*Assistant Examiner* — Nargis Sultana
(74) *Attorney, Agent, or Firm* — Oblon, McClelland, Maier & Neustadt, L.L.P.

(57) ABSTRACT

A data receiving part receives data transmitted from a plurality of measuring devices. A time determining part distinguishes management time from date and time of the data. The record generating part stores data of the same management time which are received during a predetermined acceptance time, in the same record. When un-arrived data belonging to the same management time exists at the end of the acceptance time, arrival of the un-arrived data is waited for during a predetermined wait time. Even if the data is arrived with some delay, arrival-delayed data can be stored in the same record. Thus, the missing data occurrence frequency can be suppressed.

19 Claims, 16 Drawing Sheets

(56) References Cited

U.S. PATENT DOCUMENTS

| | | | |
|---|---|---|---|
| 7,333,989 B1 | 2/2008 | Sameshima et al. | |
| 8,138,945 B2* | 3/2012 | Hayakawa et al. | 340/870.39 |
| 8,531,987 B2* | 9/2013 | Cociglio | 370/252 |
| 8,638,658 B2* | 1/2014 | Murayama et al. | 370/216 |
| 2003/0195761 A1* | 10/2003 | Greenstein et al. | 705/1 |
| 2004/0039970 A1* | 2/2004 | Barnard et al. | 714/43 |
| 2004/0179232 A1* | 9/2004 | Inukai et al. | 358/1.15 |
| 2004/0198394 A1* | 10/2004 | Syrjarinne et al. | 455/456.1 |
| 2006/0140094 A1* | 6/2006 | Tabata et al. | 369/59.1 |
| 2006/0224929 A1* | 10/2006 | Fukui et al. | 714/47 |
| 2007/0171085 A1* | 7/2007 | Imai et al. | 340/657 |
| 2008/0167056 A1* | 7/2008 | Gilzean et al. | 455/466 |
| 2009/0041155 A1* | 2/2009 | Sugai et al. | 375/299 |
| 2009/0067850 A1* | 3/2009 | Mizutani et al. | 398/154 |
| 2009/0122808 A1* | 5/2009 | Sharif-Ahmadi et al. | 370/458 |
| 2009/0170546 A1* | 7/2009 | Nishida | 455/517 |
| 2009/0177607 A1* | 7/2009 | Matsushima | 706/46 |
| 2010/0056945 A1* | 3/2010 | Holmes | 600/549 |
| 2010/0070817 A1* | 3/2010 | Heise | 714/749 |
| 2010/0082836 A1* | 4/2010 | Zhang | 709/232 |
| 2010/0189045 A1* | 7/2010 | Takeshita et al. | 370/329 |
| 2010/0195466 A1* | 8/2010 | Nosaka et al. | 369/84 |
| 2011/0145747 A1* | 6/2011 | Wong et al. | 715/771 |
| 2011/0153603 A1* | 6/2011 | Adiba et al. | 707/737 |
| 2011/0216758 A1* | 9/2011 | Hoshihara et al. | 370/350 |
| 2011/0273978 A1* | 11/2011 | Murayama et al. | 370/216 |
| 2012/0054364 A1* | 3/2012 | Andries et al. | 709/235 |
| 2012/0078856 A1* | 3/2012 | Linde | 707/679 |
| 2012/0086549 A1* | 4/2012 | Barnes, Jr. | 340/5.61 |
| 2012/0117079 A1* | 5/2012 | Baum et al. | 707/746 |
| 2012/0139750 A1 | 6/2012 | Hayakawa et al. | |
| 2012/0275333 A1* | 11/2012 | Cociglio | 370/252 |
| 2012/0327228 A1* | 12/2012 | Nomura | 348/143 |
| 2013/0080203 A1* | 3/2013 | Coley | 705/7.18 |
| 2013/0137460 A1* | 5/2013 | Bodog et al. | 455/456.2 |
| 2013/0227589 A1* | 8/2013 | Mikami et al. | 719/318 |

FOREIGN PATENT DOCUMENTS

| | | |
|---|---|---|
| JP | 10 269252 | 10/1998 |
| JP | 2000 76257 | 3/2000 |
| JP | 2008 72536 | 3/2008 |
| JP | 2008 301071 | 12/2008 |
| JP | 2008 310634 | 12/2008 |
| JP | 2009 171497 | 7/2009 |

OTHER PUBLICATIONS

Yamagishi, Y., et al., "High Performance Aggregate Search Engine and Application for Sensor Database," Mitsubishi 12, vol. 83, No. 12, pp. 11 to 14 and 56, (2009).

International Search Report Issued Aug. 31, 2010 in PCT/JP10/60352 Filed Jun. 18, 2010.

Chinese Office Action issued Dec. 25, 2014 in Chinese Application No. 201080067485.6 (with partial English translation), 12 pages.

* cited by examiner

Fig. 5

| STORAGE PERIOD | FRACTION PROCESS | RANGE TO BE STORED IN THE SAME RECORD |
|---|---|---|
| 30 SECONDS | ROUND | EVERY 30 SEC, -15 SEC TO +14 SEC FROM CURRENT TIME |
| | UP | EVERY 30 SEC, -29 SEC TO 0 SEC FROM CURRENT TIME |
| | DOWN | EVERY 30 SEC, 0 SEC TO +29 SEC FROM CURRENT TIME |
| 1 MINUTE | ROUND | EVERY MIN, -30 SEC TO +29 SEC FROM CURRENT TIME |
| | UP | EVERY MIN, -59 SEC TO 0 SEC FROM CURRENT TIME |
| | DOWN | EVERY MIN, 0 SEC TO +59 SEC FROM CURRENT TIME |
| 1 HOUR | ROUND | EVERY H, -1800 SEC TO +1799 SEC FROM CURRENT TIME |
| | UP | EVERY H, -3599 SEC TO 0 SEC FROM CURRENT TIME |
| | DOWN | EVERY H, 0 SEC TO +3599 SEC FROM CURRENT TIME |
| 1 DAY | ROUND | EVERY DAY (REFERENCE TIME:00H00M00S), -43200 SEC TO +43199 SEC FROM CURRENT TIME |
| | UP | EVERY DAY (REFERENCE TIME:00H00M00S), -86399 SEC TO 0 SEC FROM CURRENT TIME |
| | DOWN | EVERY DAY (REFERENCE TIME:00H00M00S), 0 SEC TO +86399 SEC FROM CURRENT TIME |

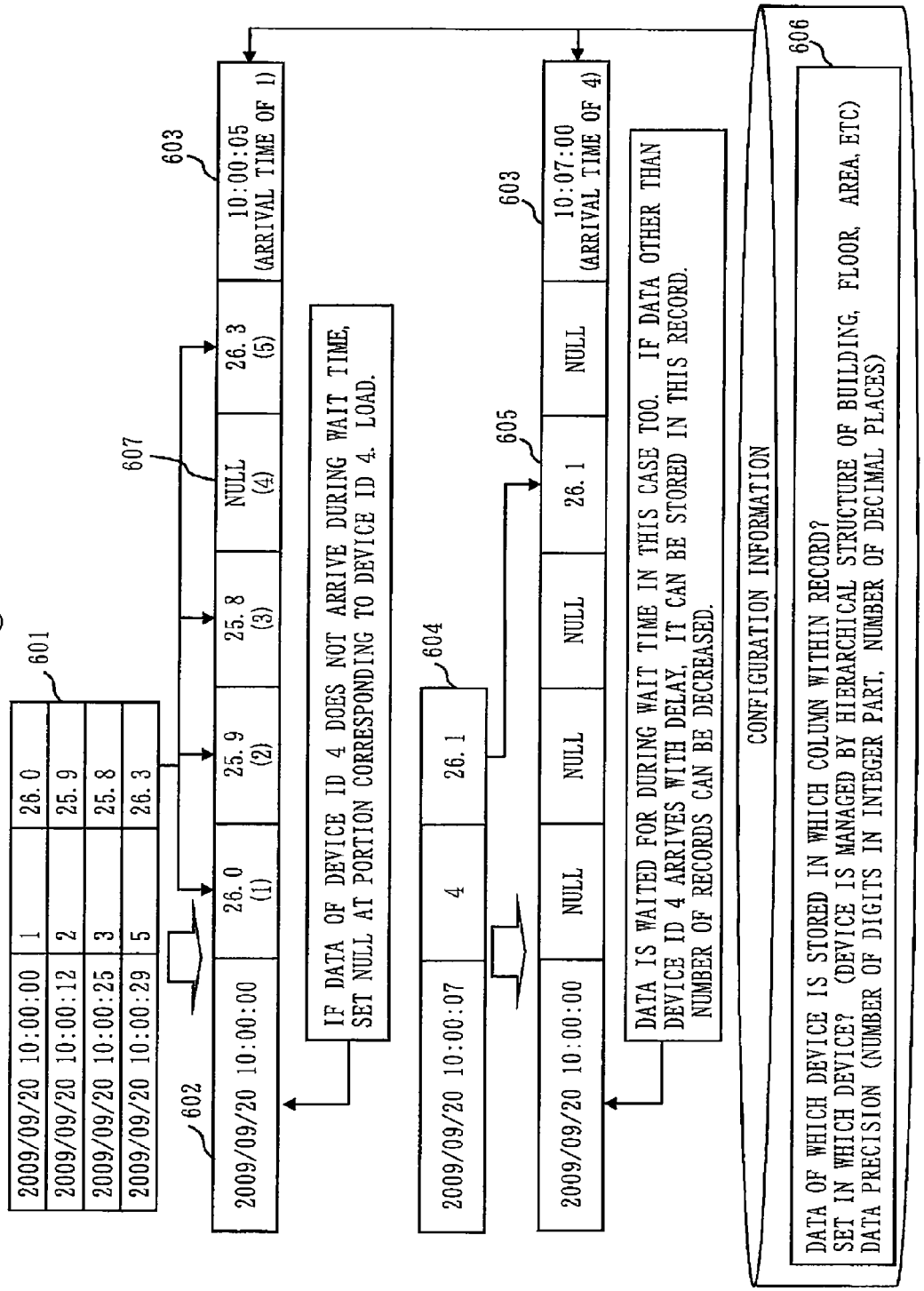

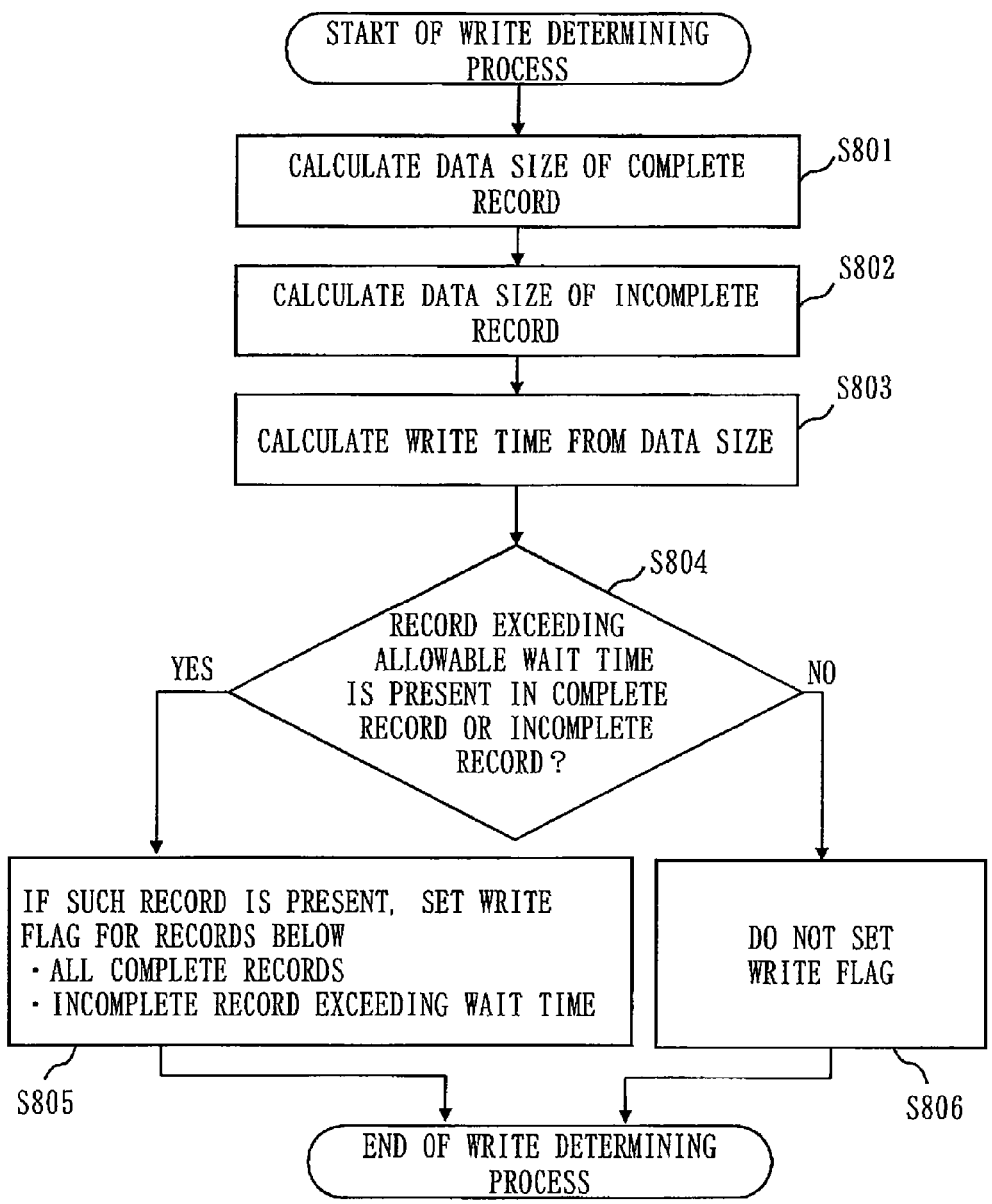

Fig. 10

| DEVICE IDENTIFIER | TABLE INFORMATION | RECORD INFORMATION | POSITION INFORMATION | DATA TYPE INFORMATION |
|---|---|---|---|---|
| 901 | 902 | 903 | 904 | 905 |

Fig. 11

| DEVICE IDENTIFIER | DEVICE ID | ID INDICATING MEASURING DEVICE | |
|---|---|---|---|
| TABLE INFORMATION | TABLE NAME | IDENTIFIER OF ACCUMULATION TARGET TABLE | |
| RECORD INFORMATION | ITEM NUMBER | INDICATES COLUMN OF GENERATED RECORD | |
| POSITION INFORMATION | BUILDING ID | INDICATES ID OF MANAGING TARGET BUILDING | 906 |
| | FLOOR ID | INDICATES FLOOR IN BUILDING | 907 |
| | AREA ID | INDICATES AREA IN THIS FLOOR | 908 |
| | PURPOSE ID | INDICATES PURPOSE | 909 |
| | DEVICE ID | IF ELECTRIC POWER, IDENTIFIES DISTRIBUTION SWITCHBOARD | 910 |
| DATA TYPE INFORMATION | DATA CATEGORY | REPRESENTS DATA CATEGORY SUCH AS TEMPERATURE, ELECTRIC POWER, ETC | 911 |
| | DATA TYPE | INDICATES DATA PRECISION | 912 |
| | NULL VALUE | SETS WHAT TO USE AS NULL VALUE | 913 |

DATA PROCESSING APPARATUS, DATA PROCESSING METHOD, AND PROGRAM

TECHNICAL FIELD

The present invention relates to a technique for inputting a plurality of pieces of data with time information added, which are periodically generated, classifying the plurality of pieces of data based on the time information, and storing the data in a database.

More specifically, the present invention relates to a technique for inputting a plurality of pieces of data indicating the measurement results of a plurality of measuring devices that perform measurement periodically, classifying the plurality of pieces of data based on time information, and storing the data in a database.

BACKGROUND ART

Generally, a measuring device such as an electric power sensor or temperature sensor performs measurement periodically and outputs data indicating the measurement result.

The data structure of the data outputted from the measuring device is constituted by "date and time" at which the measurement was conducted, a "device ID" which can identify the corresponding measuring device uniquely, and a "measurement value" obtained by the measurement.

A method which prevails conventionally most widely for managing the data in the table of the database is the one that stores the data in the table without changing the original data format described above.

If all data of the same time are to be extracted for the use of, for example, monitoring, at once from the database which has been accumulated in the above format, since the time added to the data itself differs depending on the measuring device, it is difficult to compare the data which are measured at the same time.

According to the conventional management scheme, the data of the respective devices are stored all in the direction of column for each time. When, for example, the correlation between the temperature and electric power is to be obtained, a complicated process is required.

As opposed to the above scheme, for the object of comparing sensor data which are measured periodically, in a time series manner, Patent Literature 1 discloses a technique for generating a record segmented on the time base, and storing data in a record whose time is close to the time of the data, so that a plurality of pieces of data having the same time or times close to each other are stored in one record.

CITATION LIST

Patent Literature

Patent Literature 1: JP 2008-301071

SUMMARY OF INVENTION

Technical Problem

The technique of Patent Literature 1 described above allows storing data which are assumed to have been measured at the same time, in one record, and comparing data of, for example, acceleration sensors attached to a plurality of people, as time series data.

According to this technique, received data are stored in a table in the order they arrive, each as a record having "date and time", a "sensor identifier", and a "measurement value". According to this technique, data transmitted from sensors are under wait time control and data acquired at the same time are re-stored in one record.

With the technique of Patent Literature 1, after the collected data are written in the table in the order they arrive, the data which are assumed to have been measured at the same time are re-stored in the same record. This can cause a time delay when, for example, performing data search.

Even when the record storing scheme of Patent Literature 1 is executed between data reception and accumulation (storing data in the table), if a data arrival delay occurs due to network congestion or the like, a problem arises in which the delayed data cannot be stored in the same table as data (non-delayed data) assumed to have been measured at the same time as the delayed data.

In view of the above problem, the present invention mainly aims to realize a scheme which, even if a delay occurs in data arrival, can store the data that has arrived with a delay, in the same table as data assumed to have been measured at the same time as the delayed data, in the scheme which receives data transmitted periodically and stores the received data in a record for corresponding time before adding the record to the table.

Solution to Problem

A data processing apparatus according to the present invention manages a record based on management time of a predetermined width, and includes:

a data receiving part which receives data to which a time stamp is added and which is transmitted with a predetermined period, the time stamp indicating time;

a time determining part which, each time the data receiving part receives data, determines management time corresponding to the time of the time stamp added to the received data, and classifies the received data under the management time;

a record generating part which updates record target management time, being a target of record generation, in the course of time; generates a record by arranging data, which is classified under current record target management time and which is inputted from the time determining part during a predetermined acceptance time since start of input of data classified under the current record target management time from the time determining part; if un-arrived data exists which has not been inputted yet at an end of the acceptance time among data classified under the current record target management time, waits for input of the un-arrived data during a predetermined wait time, adds un-arrived data inputted by an end of the wait time to the record, and completes generation of the record; and if un-arrived data exists which has not been inputted yet at the end of the wait time, adds a value representing an existence of the un-arrived data to the record, and completes generation of the record; and a table adding part which adds the record completely generated by the record generation part, to a predetermined table.

Advantageous Effects of Invention

According to the present invention, at the end of an acceptance time, if un-arrived data exists, input of the un-arrived data is waited for during a wait time. Data inputted by the end of the wait time is also added to the record for the same management time. Then, record generation is completed. Therefore, even if data arrives with some delay, the delayed data can be stored in the record, and the missing data occurrence frequency can be suppressed.

BRIEF DESCRIPTION OF DRAWINGS

FIG. 5 is a diagram for explaining a method of calculating management time of a record according to Embodiment 1.

FIG. 6 is a diagram showing a practical example of a procedure of storing data into a record according to Embodiment 1.

FIG. 9 is a flowchart showing a write determining process according to Embodiment 1.

FIG. 10 is a diagram showing an example of configuration information according to Embodiment 1.

FIG. 11 is a diagram showing the respective elements of the configuration information according to Embodiment 1.

DESCRIPTION OF EMBODIMENTS

Embodiment 1

In this embodiment, a data management technique will be described which can write data received from various types of measuring devices such as an electric power sensor or temperature sensor, in a table, and can search/total data with no trouble.

More specifically, in a scheme which determines records corresponding to respective data based on time before writing the records in the table, and stores the respective data in the corresponding records, a technique will be described which, when data arrival delay occurs, postpones the write process of the record in the table as much as possible and waits for the data to arrive, so that record generation in a real-time manner is enabled, and data missing in the record is suppressed.

In this embodiment, a technique will be described which prevents degradation in performance by decreasing the frequency of writing data arriving periodically in the record and, if missing occurs in a record due to data delay, adds the delayed data to the table when the delayed data arrives, so that data discard is avoided.

A record generation scheme in a data real-time load function which is applied to an environmental IT system will be described below. Note that the record generation scheme according to this embodiment is not limited to the application to the environmental IT system.

The record generation scheme according to this embodiment can be applied to every system that collects and manages data coming from a measuring device which performs measurement periodically.

Figure 1:
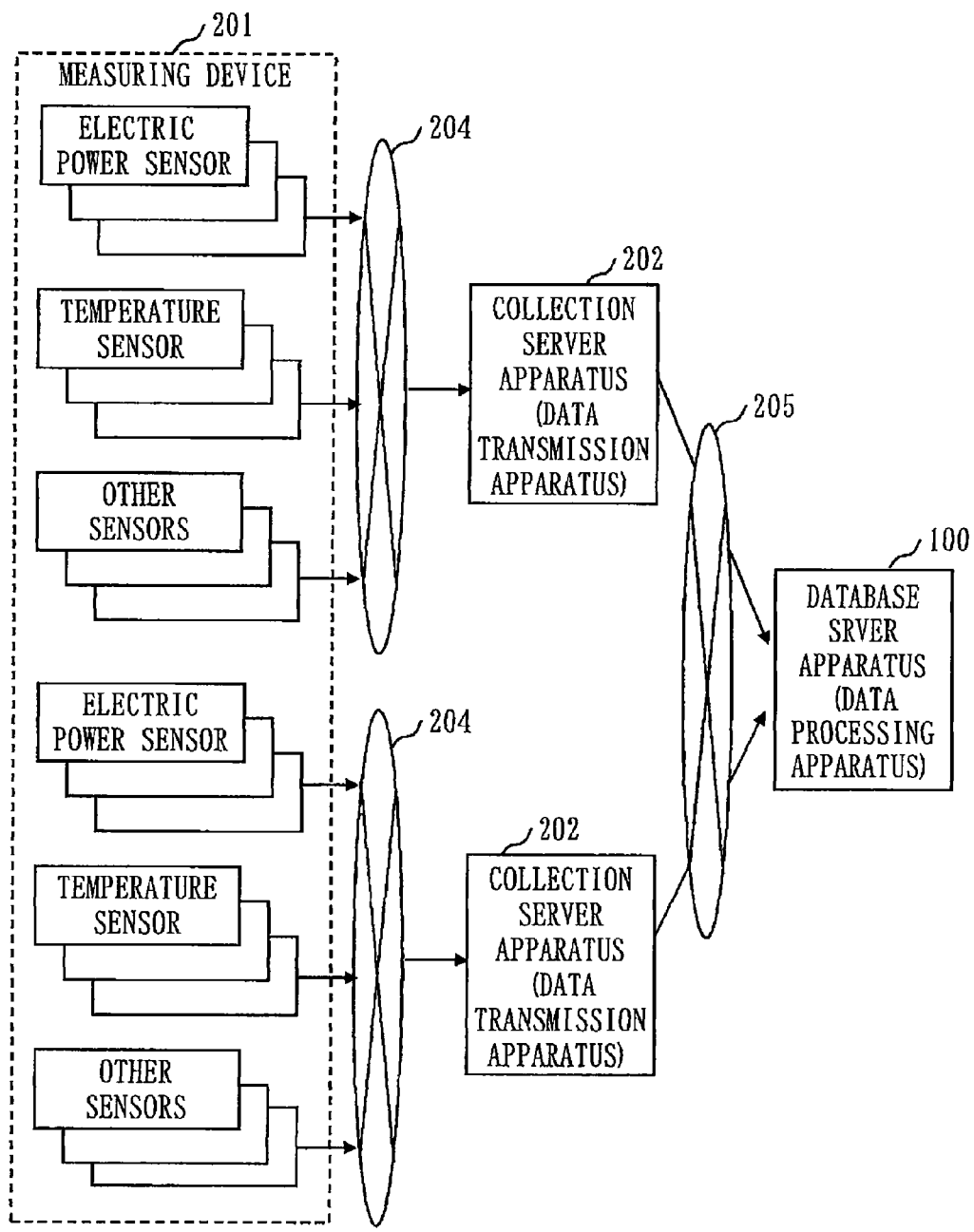
FIG. 1 is a diagram showing a system configuration according to Embodiment 1.

FIG. 1 is a diagram showing an overall configuration of an environmental IT system according to this embodiment.

A general data flow will be described with reference to FIG. 1.

The environmental IT system according to this embodiment is constituted by a plurality of measuring devices 201, a collection server apparatus 202, and a database server apparatus 100. The measuring devices 201 perform measurement periodically, and transmit data exhibiting the measurement values periodically. The collection server apparatus 202 collects the data transmitted by the measuring devices 201. The database server apparatus 100 accumulates the data collected by the collection server apparatus 202, in the form of a record.

The data are measured by various types of measuring devices 201 such as an electric power sensor or temperature sensor, and are temporarily collected by the collection server apparatus 202 via a network 204.

A plurality of collection server apparatuses 202 may exist in the system.

The collection server apparatus 202 transmits the collected data to the database server apparatus 100 via a network 205. The database server apparatus 100 accumulates the data from the collection server apparatus 202.

The database server apparatus 100 classifies the data received from the collection server apparatus 202 based on the time and stores the classified data in a correct record. The database server apparatus 100 adds a record that stores data belonging to the same time window, to the table.

The database server apparatus 100 is an example of a data processing apparatus. The collection server apparatus 202 is an example of a data transmission apparatus.

Figure 3:
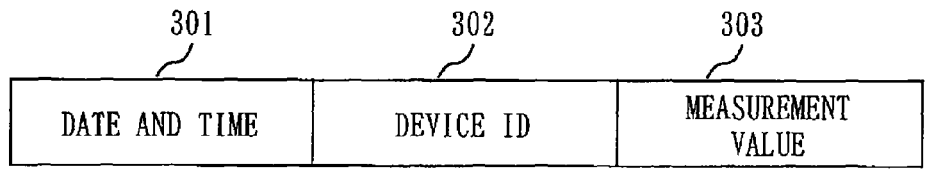
FIG. 3 is a diagram showing a configuration of data according to Embodiment 1.

The data generated by the measuring device 201 and accumulated in the database server apparatus 100 has a data structure shown in, for example, FIG. 3.

Date and time 301 is a time stamp which indicates, for example, the time at which the data was measured by the measuring device 201.

Device ID 302 is an identifier of the measuring device 201 which can uniquely identify the measuring device 201 that conducted the measurement.

Measurement value 303 is a value measured by the measuring device 201. For example, when the measuring device 201 is a temperature sensor, the measurement value 303 is temperature. When the measuring device 201 is an electric power sensor, the measurement value 303 is electric power.

Figure 2:
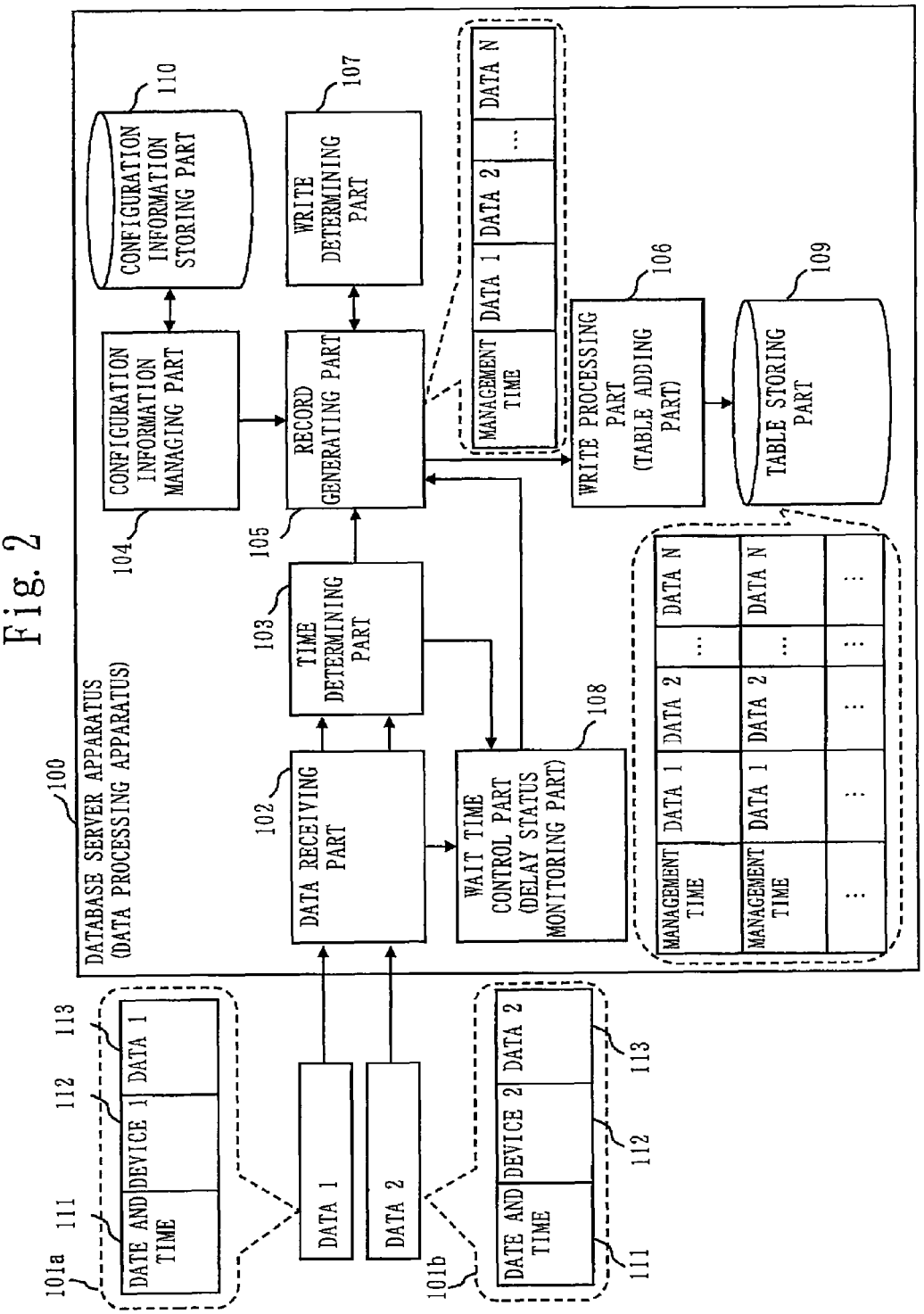
FIG. 2 is a diagram showing a configuration of a database server apparatus according to Embodiment 1.

FIG. 2 shows a configuration of the database server apparatus 100 according to this embodiment.

The respective elements of the database server apparatus 100 will be explained with reference to FIG. 2.

A data receiving part 102 receives a plurality of pieces of data 101 transmitted from the collection server apparatus 202.

The data 101 has a data format shown in FIG. 3.

Each time the data receiving part 102 receives the data 101, a time determining part 103 determines management time corresponding to the time of the time stamp added to the received data 101. The time determining part 103 classifies the received data 101 under the corresponding management time.

The database server apparatus 100 manages the record by management time of a predetermined width (for example, 30 seconds or 1 minute), as will be described later.

Therefore, the time determining part 103 determines under which management time the time indicated by date and time 111 of the data 101 received by the data receiving part 102 falls, and classifies the data 101 to any one management time.

A configuration information managing part 104 manages configuration information.

The configuration information is information that defines the location where the measuring device 201 is set, the relation between the device ID and the column position in the record, the type of the measurement value (whether the measurement value is temperature or electric power), and the like.

The configuration information is stored in a configuration information storing part 110.

A record generating part 105 arranges data 101 belonging to the same management time, in the same record according to the column positions defined by the configuration information.

In the example of FIG. 2, the record generating part 105 generates one record by arranging data 1 to data N belonging to the same management time.

The record generating part 105 has a temporary storage device which stores the record temporarily. The record generating part 105 holds the generated record in the temporary storage device for a predetermined period of time.

In the course of time, the record generating part 105 updates the record target management time which is the target of record generation, and generates the record by arranging data classified under the current record target management time inputted from the time determining part 103 during a predetermined acceptance time since input start of the data classified under the current record target management time from the time determining part 103.

When the acceptance time ends, if un-arrived data that has not arrived yet exists among the data classified under the current record target management time, the record generating part 105 determines whether or not to wait for input of the un-arrived data at the acceptance time end.

If input of the un-arrived data is to be waited for, the record generating part 105 waits for the input of the un-arrived data during a predetermined wait time. The record generating part 105 adds, to the record, the un-arrived data that has been inputted by the end of the wait time, and completes generation of the record.

If un-arrived data that has not been inputted exists at the end of the wait time, the record generating part 105 adds a value indicating the existence of the un-arrived data to the record, and completes generation of the record.

If input of the un-arrived data is not to be waited for, the record generating part 105 adds to the record a value indicating the existence of the un-arrived data when the acceptance time ends, and completes generation of the record.

Furthermore, when the record generating part 105 inputs data classified under past record target management time from the time determining part 103, with a delay, the record generating part 105 generates the record of delay data that has been inputted with the delay. If un-arrived data exists which is classified under the same management time as the delay data and which has not been inputted yet, the record generating part 105 waits for input of the un-arrived data for the predetermined wait time. The record generating part 105 adds, to the record, the un-arrived data that has been inputted by the end of the wait time, and completes generation of the record.

If un-arrived data exists which has not been inputted yet at the end of the wait time, the record generating part 105 adds a value indicating the existence of the un-arrived data, to the record, and completes generation of the data.

A wait time control part 108 calculates a wait time allowed for the data arrival delay from a delay time preset by the system, a time required for open/close and other processes, and the like, and determines whether or not to wait for individual data according to a selected wait time control scheme.

The delay time is a time taken since the data arrives until the user can refer to the data.

The wait time control part 108, more specifically, monitors the delay status of data reception of each collection server apparatus 202.

If un-arrived data exists, the record generating part 105 determines whether or not to wait for input of the un-arrived data, based on the monitoring result of the wait time control part 108 for the collection server apparatus 202 which is the sender of the un-arrived data.

The wait time control part 108 is an example of a delay status monitoring part.

A write determining part 107 determines which record on the temporary storage device of the record generating part 105 is to be written, from the wait time, data size which is the target of a write process, and the like.

A write processing part 106 writes a record determined by the write determining part 107 as being the write target, in a table storing part 109.

The write processing part 106 is an example of a table adding part.

The table storing part 109 stores a table where the records of the respective management times are arranged in the time-series manner, as shown in FIG. 2.

A record newly generated by the record generating part 105 is added to the bottom of the table.

Figure 4:
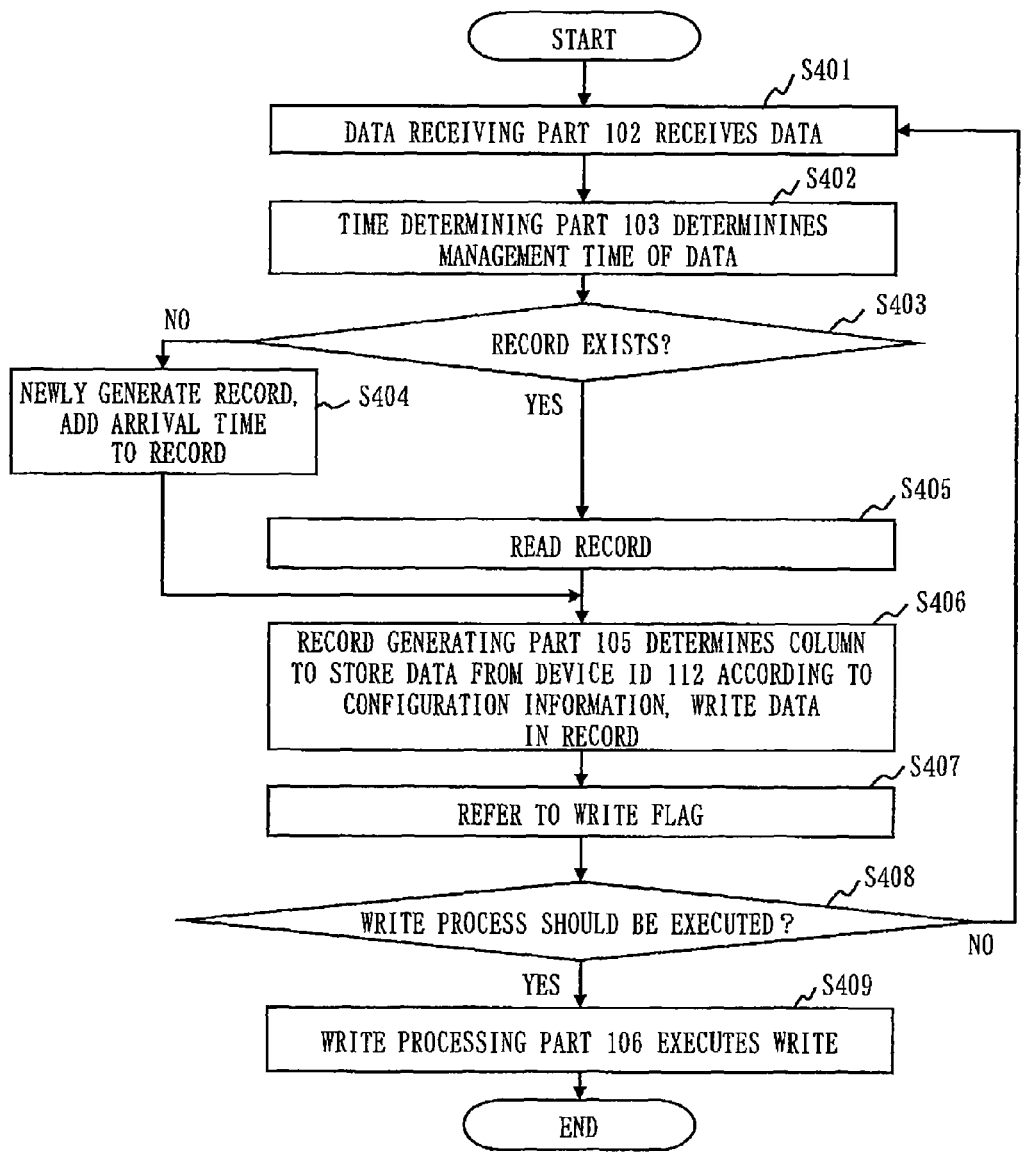
FIG. 4 is a flowchart showing the outline of the operation of the database server apparatus according to Embodiment 1.

An operation example of the database server apparatus 100 according to this embodiment will now be described with reference to the flowchart of FIG. 4.

When the data receiving part 102 receives the data 101 in step S401, the time determining part 103 acquires the date and time 111 of the data 101, distinguishes management time corresponding to the date and time 111, and classifies the data 101 according to the management time in step S402.

In step S403, the record generating part 105 determines whether or not a record (a record corresponding to the management time to which the data 101 belongs) where the data 101 should be stored already exists in the temporary storage device, according to the classification by the time determining part 103.

If such a record does not exist, then in step S404, the record generating part 105 newly generates a record, and adds the arrival time of data 101 which has arrived first (for example, the time at which the record generating part 105 inputs the data 101) to the newly generated record.

If such a record has already been generated in the determination of step S403, then in step S405, the record generating part 105 reads the existing record from the temporary storage device.

In step S406, the record generating part 105 notifies the configuration information managing part 104, of the device ID 112 of the individual data received by the data receiving part 102. For each device ID 112, the record generating part 105 acquires, from the configuration information managing part 104, a column position where data 113 (measurement value) should be stored, determines the column position for each data 113, and writes data in the record.

In step S407, the write determining part 107 determines whether or not to execute a write process of writing the record already generated in step S408 in the table of the table storing part 109.

If the write process is to be executed, the write processing part 106 executes the write process for every record which is a write target.

If the write process is not to be executed, the flow returns to step S401, and reception of data 101 is waited for.

When new data is recognized, the record generating part 105 determines whether or not a record having corresponding time is generated on the memory (temporary storage device). If such a record exists, the record generating part 105 stores the data in that record. If such a record does not exist, the record generating part 105 generates a new record. If data corresponding to the respective items exist, data are stored in those items, and NULL is stored in the remaining items (items for which no corresponding data exist).

The record generating part 105 only executes this operation at constant intervals and does not execute a write determination.

The write determining part 107 serves to determine whether or not a record should be written by the designated wait time control scheme. The record generating part 105 and the write determining part 107 operate independently of each other and asynchronously with each other.

The details of the operation of the time determining part 103 will now be described.

The time determining part 103 acquires the data 101 from the data receiving part 102 and calculates management time corresponding to the date and time 111 of the data 101.

FIG. 5 is a table explaining calculation of the management time by the time determining part 103.

The management time is determined by a designated storage period 501. Every data 101 is to be stored in any one of records each having one management time.

The width of the management time coincides with the storage period 501.

To which management time individual data corresponds is determined by the storage period 501 and a fraction process 502.

For example, when the value (the width of the management time) of the storage period 501 is 30 seconds, dates and times 111 within the range of 30 seconds are classified under the same management time.

The range classified to one management time is determined by the fraction process 502.

If the fraction process 502 is ROUND (round-off), data having date and time 111 within the range of −15 seconds to +14 seconds from the management time is to be stored in a record corresponding to this management time.

If the fraction process 502 is UP (round-up), data having date and time 111 within the range of −29 seconds to 0 second from the management time is to be stored in a record corresponding to this management time.

If the fraction process 502 is DOWN (round-down), data having date and time 111 within the range of 0 second to +29 seconds from the management time is to be stored in a record corresponding to this management time.

For example, assume that the storage period is 30 seconds and that the management time is 10h00m00s. If the fraction process 502 is ROUND (round-off), date and time 111 within the range of 9h59m45s to 10h00m14 s as date and time is classified under this management time (10h00m00s).

If the fraction process 502 is UP (round-up), date and time 111 within the range of 9h59m31 s to 10h00m00s as date and time is classified under this management time (10h00m00s).

If the fraction process 502 is DOWN (round-down), date and time 111 within the range of 10h00m0s to 10n00m29s as date and time is classified under this management time (10h00m00s).

By the process of the time determining part 103 in this manner, record management in a format that matches the data collection period becomes possible.

The storage period 501 is a period for acquiring reference time, individual data under which are deemed to be the same. The storage period 501 need not be the same as the actual collection period of the measuring device 201.

Note that a value equal to or under the collection period of the measuring device 201 cannot be set as the storage period 501.

Although the fraction process is exemplified by round-off, round-up, and round-down, the fraction process is not particularly limited to these processing methods.

An operation example of the record generating part 105 according to this embodiment will be explained with reference to FIGS. 19 and 20.

The record generating part 105 inputs the data 113 (measurement value), the device ID 112, and the management time determined by the time determining part 103, from the time determining part 103 (S1601).

Then, the record generating part 105 analyzes whether the inputted management time is new (S1602).

More specifically, the record generating part 105 determines whether the inputted management time is the same as the management time of the record which is currently under generation, that is, whether the inputted management time is the same as the management time for which the acceptance time or wait time is currently being measured.

As the result of the analysis, if the management time is new (YES in S1603), the record generating part 105 starts measuring the acceptance time.

Note that a record is going to be generated for this new management time, and this new management time is treated as the record target management time.

The record generating part 105 sets an acceptance time in, for example, a predetermined timer, and starts the timer.

For example, the acceptance time is half the storage period (the width of the management time).

When the storage period is 1 minute and the arrival time of the first data is 10h00m05s, the acceptance time of the record with management time 10h00m00s lasts until 10h00m35s. The duration of the acceptance time can be determined by the system administrator arbitrarily.

Furthermore, the record generating part 105 generates a record for storing the data 113 (measurement value) classified under the new management time. The record generating part 105 adds to the generated record the arrival time at which the first data 113 (the data 113 inputted in S1601) classified under the new management time arrives (S1606).

If the management time of the data 113 inputted in S1601 is not new (NO in S1603), the record generating part 105 reads a record corresponding to this management time from a temporary storage area (S1604).

Furthermore, the record generating part 105 determines whether an acceptance time is currently under measurement for the management time. If the acceptance time is currently under measurement (YES in S1611), the flow advances to S1607. If the acceptance time is not currently under measurement (NO in S1611), a wait time is currently under measurement. Thus, a process from S1702 downward is executed. The process from S1702 downward will be described later.

In S1607, the record generating part 105 reads configuration information from the configuration information storing part 110 via the configuration information managing part 104 (S1607).

Furthermore, according to the configuration information, the record generating part 105 stores the data 113 inputted in S1601, in a column of the record generated in S1606 or read in S1604 (S1608).

As described above, for each device ID 112, the configuration information designates columns where the data 113 are to be stored. The record generating part 105 stores the data 113 in the column corresponding to the device ID 112 received in S1601.

Then, the record generating part 105 checks whether data are stored in all columns of the record (S1609). Hall data are stored (YES in S1609), the record generating part 105 completes record generation (S1711), and notifies the write determining part 107 that record generation has completed.

If data not stored in the record exists (NO in S1609), the record generating part 105 determines whether the acceptance time, measurement of which is started in S1605, is ended. If the acceptance time is not ended yet (NO in S1610), the process is returned to S1601, and the record generating part 105 waits for input from the time determining part 103.

If the acceptance time is ended (YES in S1610), namely if data not stored in the record yet (un-arrived data) exists at the acceptance time end, the record generating part 105 determines whether or not to wait for the un-arrived data that has not arrived yet at the acceptance time end (S1701).

The criterion for determining whether or not to wait for the un-arrived data is based on the monitoring result of the wait time control part 108. The operation of the wait time control part 108 will be described later.

The process after this differs depending on to wait for which un-arrived data (S1702).

If data to be waited for and data not to be waited for both exist, as in a case where some un-arrived data is to be waited for and the rest is not to be waited for, the process of S1705 to S1710 is executed for the data to be waited for, and the process of S1704 is executed for the data not to be waited for (S1703).

If none of the un-arrived data is to be waited for, the record generating part 105 stores a NULL value (a value indicating the existence of un-arrived data) in a column which is to store un-arrived data at the acceptance time end according to the configuration information. The record generating part 105 completes record generation (S1711), and notifies the write determining part 107 that record generation has completed.

If all of the un-arrived data are to be waited for, the record generating part 105 starts measuring the wait time (S1705).

The record generating part 105 sets a wait time in, for example, a predetermined timer, and starts the timer.

For example, the wait time is a quarter of the storage period (the width of the management time) following the end of the acceptance time.

When the storage period is 1 minute, the arrival time of the first data is 10h00m05s, and the acceptance time is 30 seconds, the wait time of the record with management time 10h00m00s is from 10h00m35s to 10h00m50s. The duration of the wait time can be determined by the system administrator arbitrarily.

If un-arrived data is inputted (YES in S1706), the un-arrived data is stored in a predetermined column of the record according to the configuration information (S1707).

Then, the record generating part 105 checks whether data are stored in all columns of the record (S1708). If all data are stored (YES in S1708), the record generating part 105 completes record generation (S1711), and notifies the write determining part 107 that record generation has completed.

If data not stored in the record exists (NO in S1708), the record generating part 105 determines whether the wait time, measurement of which is started in S1705, is ended. If the wait time is not ended yet (NO in S1709), the process is returned to S1706, and the record generating part 105 waits for input of un-arrived data.

If the wait time is ended, the record generating part 105 stores a NULL value (a value indicating the existence of un-arrived data) in a column which is to store un-arrived data at the wait time end according to the configuration information (S1710). The record generating part 105 completes record generation (S1711), and notifies the write determining part 107 that record generation has completed.

If NO in S1611, the data 113 received in S1601 is un-arrived data inputted during the wait time.

If it is determined in S1702 to wait for all data, when the un-arrived data is received, the determination of S1706 becomes YES. The un-arrived data is processed in S1707, and the determinations of S1708 and S1709 are executed.

If it is determined in S1702 that data to be waited for and data not to be waited for both exist and the record generating part 105 waits for the un-arrived data, when the un-arrived data is received, the determination of S1706 becomes YES. The un-arrived data is processed in S1707, and the determinations of S1708 and S1709 are executed. If the record generating part 105 does not wait for the un-arrived data, a NULL value has already been set in S1704. Therefore, the un-arrived data is discarded.

Alternatively, the un-arrived data may overwrite the NULL value which has already been set.

There is a case where the wait time is ended (YES in S1709), the NULL value is stored for the un-arrived data (S1710), generation of the record where the NULL value exists is completed (S1711), the record where the NULL value exists is added to the table in the table storing part 109, and after that the un-arrived data (delay data) is inputted from the time determining part 103.

In this case, although the management time of the un-arrived data (delay data) is past record target management time, it is determined as being new management time (YES in S1603), and a process from S1605 is executed.

For example, assume a case where a NULL value is included in the record for management time 10h00m00s because of the existence of un-arrived data, the record with the management time 10h00m00s is added to the table of the table storing part 109, and after that un-arrived data classified under the management time 10h00m00s is inputted from the time determining part 103 with a delay (S1601).

As a record corresponding to the management time 10h00m00s for the un-arrived data (delay data) is not currently under generation, the management time for the un-arrived data (delay data) is determined as being new management time (YES in S1603). Thus, when the un-arrived data (delay data) is inputted, measurement of the acceptance time is started (S1605), and a record for the management time 10h00m00s is generated again.

The arrival time of the un-arrived data (delay data) is added to the record (S1606), and the un-arrived data (delay data) is stored in the newly generated record for the management time 10h00m00s. If another un-arrived data exists, arrival of this another un-arrived data is waited for during the acceptance time (S1609, S1610).

If another un-arrived data exists but is not inputted by the end of the acceptance time, then arrival of this another un-arrived data is waited for during the wait time, if necessary.

In this manner, after the record is added to the table, when un-arrived data (delay data) arrives with a delay, the record generating part 105 generates a record for storing the delay data, and waits for the arrival of another un-arrived data during the acceptance time and, further, if necessary, during the wait time.

Figure 19:
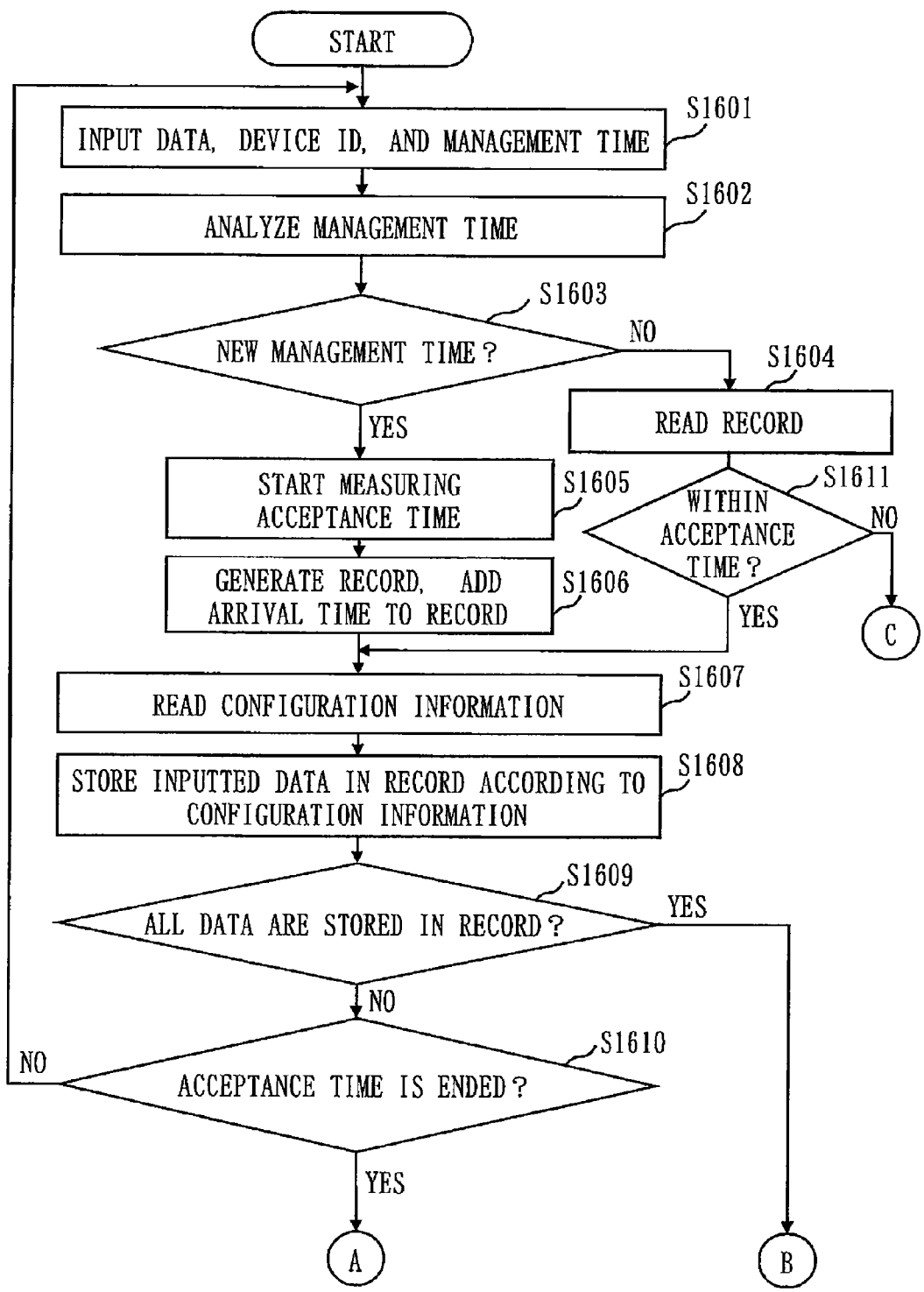
FIG. 19 is a flowchart showing a processing flow of a record generating part according to Embodiment 1.

In the above explanation, if it is determined in S1609 of FIG. 19 that all data are stored in the record, record generation is completed before the end of the acceptance time (S1711). Alternatively, even when all data are stored in the record, record generation may be completed after the acceptance time ends.

Figure 20:
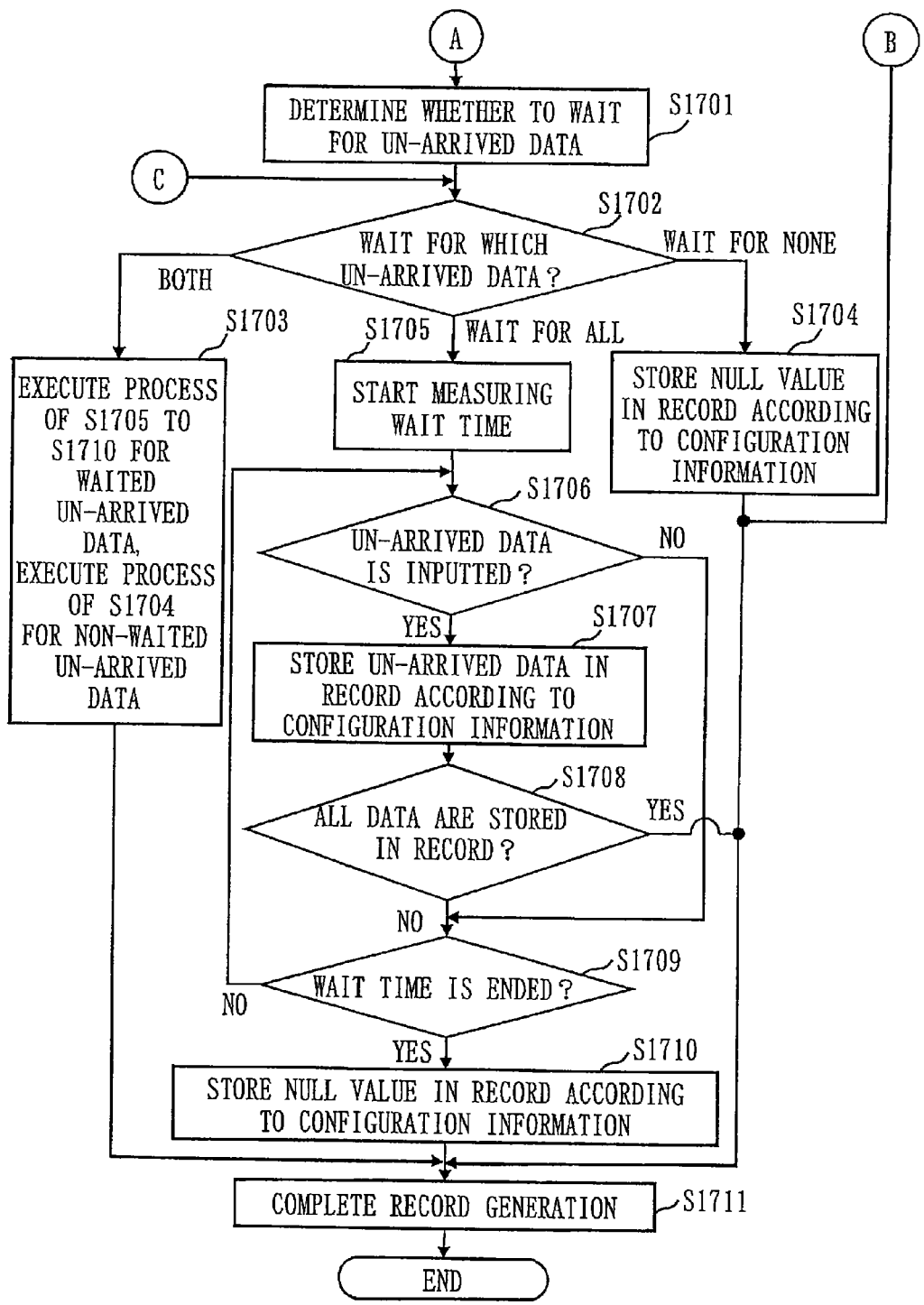
FIG. 20 is a flowchart showing the processing flow of the record generating part according to Embodiment 1.

FIG. 6 is an illustration that specifically explains the process of the record generating part 105 shown in FIGS. 19 and 20.

For the sake of simple explanation, suppose that five measuring devices are provided, the record generation period is 1 minute, and fractions are processed by round-off.

Assume that four pieces of data 601 from four measuring devices 201 have arrived via the collection server apparatus 202.

The dates and times, the device IDs, and the measurement values of the four pieces of data are as shown in FIG. 6.

At this time point, assume that only data corresponding to a device ID=4 is delayed.

The management time derived for the four pieces of data by the time determining part 103 is 10:00:00 (10h00m00s).

Since a record for 10:00:00 does not exist at the data input time point, the record generating part 105 newly generates a record for 10:00:00 (to be referred to as a record 602 hereinafter).

The record generating part 105 acquires the arrival time (10:00:05) of the device ID=1 which is the data that has arrived first, from the timer, and adds it as arrival time 603 of the record 602.

Furthermore, the record generating part 105 determines in which columns of the record the data of the respective devices are to be stored, by referring to configuration information 606. The record generating part 105 stores the respective data in the record by arranging the data in the corresponding columns.

After that, if data for the device ID=4 does not arrive even after the acceptance time is ended, the record generating part 105 determines whether or not to wait for the late data. If it is determined that the late data is to be waited for, the record generating part 105 waits for this data during the wait time.

If the un-arrived data does not arrive during the wait time, the record generating part 105 stores a NULL value in a column 607 where the un-arrived data should be stored. The record generating part 105 completes record generation. The write processing part 106 adds this record to the table of the table storing part 109.

After the record 602 is accumulated in the table storing part 109, if the data for the device ID=4 (to be referred to as data 604 hereinafter) arrives with a delay, the time determining part 103 classifies the data 604 under the management time 10:00:00.

As the record for the management time 10:00:00 is not currently under generation, the record generating part 105 determines that the management time of the delay data is new management time, and generates a record for the management time 10:00:00 (to be referred to as a record 605 hereinafter) again.

The record generating part 105 adds the arrival time (10:07:00) of the data 604 to the record 605. The record generating part 105 also stores the measurement value of the data 604 at a predetermined position according to the configuration information 606.

The measurement values for the device ID=1, 2, 3, and 5 are already stored in the record 602. Hence, in the record 605, NULL values are set in columns corresponding to these measurement values.

The record generating part 105, for example, inquires of the write processing part 106 whether a record having the same management time as the management time 10:00:00 of the record 605, is stored in the table. If the record having the same management time as the management time 10:00:00 is stored in the table storing part 109, the record generating part 105 is notified by the write processing part 106 of a column (or device ID) that already stores the measurement value.

Then, the record generating part 105 can distinguish a column in the record 602 that already stores a measurement value, and can store a NULL value in the corresponding column.

If another non-arrived data exists, the record generating part 105 waits for it during the acceptance time and, if necessary, the wait time. In the case of FIG. 6, all the measurement values for ID=1 to 5 are stored in the record 602 and the record 605, and no un-arrived data exists. Hence, the record generating part 105 completes generation of the record 605. The write processing part 106 adds the record 605 to the table of the table storing part 109.

Figure 7:
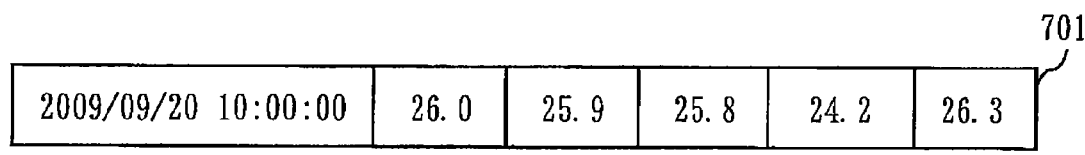
FIG. 7 is a diagram showing an example of a complete record according to Embodiment 1.
Figure 8:
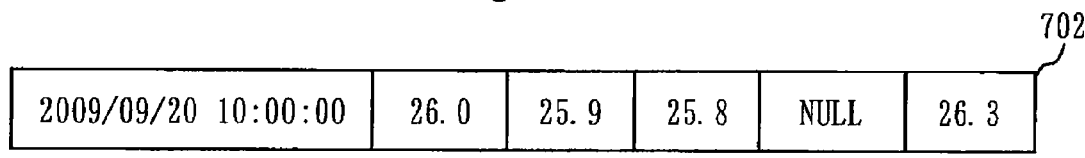
FIG. 8 is a diagram showing an example of an incomplete record according to Embodiment 1.

A record that stores all data, as shown in FIG. 7, is called a complete record 701, and a record that has one or more pieces of missing data, as shown in FIG. 8, is called an incomplete record 702.

Figure 14:
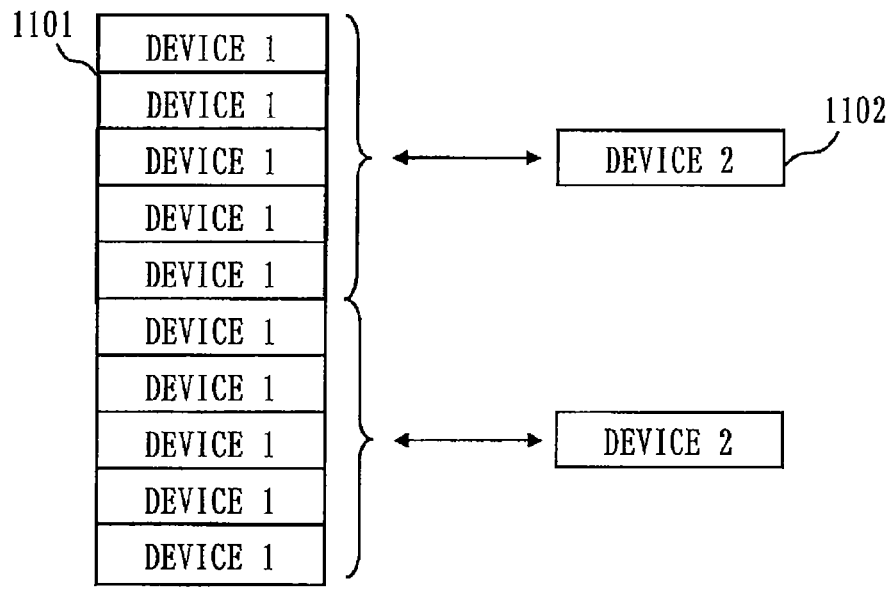
FIG. 14 is a diagram showing the relation between two types of data having different collection periods according to Embodiment 1.

FIG. 14 shows a case where different collection periods are applied to two pieces of data. A 1-minute period is applied to data 1101, and a 5-minute period is applied to data 1102.

In this case, if the value of the storage period 501 and the value of the collection period are the same, the data 1102 of 5-minute period is stored in the same record as any one of data 1101 collected during 5 minutes.

If the storage period of the data 1102 of a measuring device 2 of 5-minute period is set to 5 minutes, for example, the data 1102 having collection time of 09:01 is stored in the same record as any one of data 1101 respectively having management times 09:01, 09:02, 09:03, 09:04, and 09:05 of a measuring device of 1-minute period.

Namely, which one out of the five pieces of data 1101 from a measuring device 1 is to be stored together with the data 1102 from the measuring device 2 in the same record, depends on the arrival timing of the data from the measuring device 2.

Figure 15:
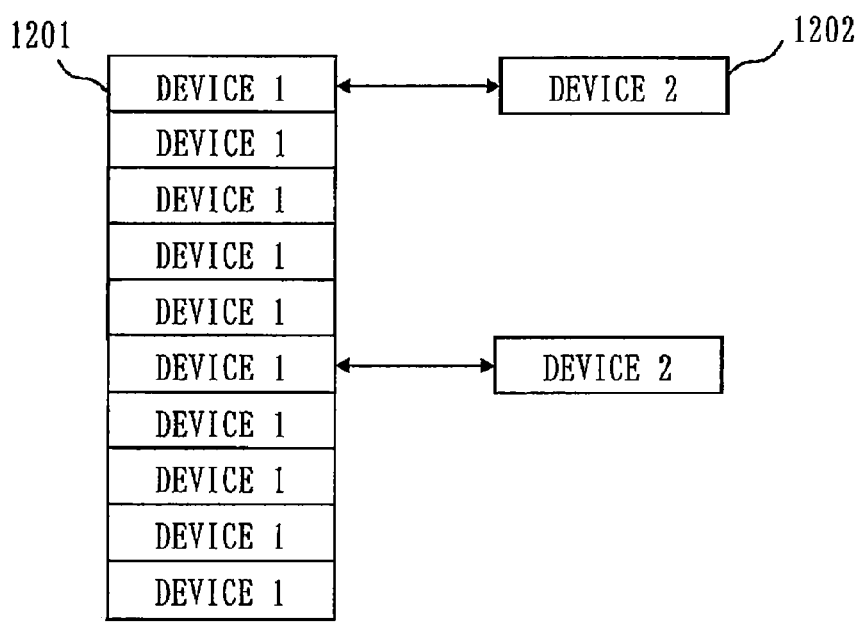
FIG. 15 is a diagram showing the relation between two types of data having different collection periods according to Embodiment 1.

Alternatively, assume a case where data needed to be stored in the same record only when they are collected at precisely the same collection time and otherwise data needed to be stored in different records, as shown in FIG. 15. In this case, if the value of the storage period 501 of data 1202 and the value of the storage period of data 1201 are both set to 1 minute, then the data can be stored.

More specifically, assume that data, although being 5-minute-period data, is stored by a storage period of 1 minute. Then, the data 1202 at collection time of, for example, 09:01, is merged with the data 1201 at collection time 09:01, as shown in FIG. 15.

In FIG. 15, the data 1201 is data to which a collection period of 1 minute is applied, and the data 1102 is data to which a collection period of 5 minute is applied.

An operation example of the write determining part 107 will be explained with reference to FIG. 9.

When the write determining part 107 is called by the record generating part 105, it calculates the data size of the complete record 701 in step S801, and calculates the data size of the incomplete record 702 in step S802.

Even when the record is incomplete, its data size is calculated by assuming that the data is complete.

Then, in step S803, the write determining part 107 calculates a write process time from the acquired data size, and calculates an optimum allowable wait time from the write process time and the wait time which is set by the wait time control part 108.

The optimum allowable wait time is calculated, for example, in accordance with:

(current optimum allowable wait time)=(wait time)−(last write process time)

As the write process time changes depending on the already-written data size, the last write process time is employed.

The current write process time is used to calculate the next optimum allowable wait time.

The wait time is derived in accordance with:

(wait time)=(delay time)/(monitoring period)

Both the delay time and the monitoring period are set by the user such as the system administrator.

If optimum wait time control is to be performed, then in step S804, the write determining part 107 determines whether a record exceeding the allowable wait time exists among complete records 701 or incomplete records 702.

If the record exceeding the allowable wait time exists, then in step S805, for a complete record, the write determining part 107 sets a write flag in the write determination flag region of every record.

For an incomplete record, the write determining part 107 determines whether each record exceeds the wait time. The write determining part 107 sets a write flag in a write determination flag region only for a record exceeding the wait time, and ends write determination.

If a record exceeding the wait time does not exist, then in step S806, the write determining part 107 does not set a write flag, and the write determination is ended.

The above explanation presumes that un-arrived data is to be waited for. If un-arrived data is not to be waited for, a write flag is always set.

When optimum wait time control is to be performed, a determination is executed to satisfy a designated guarantee against a constraint from the delay time. If a write flag is set in this case, a write process need be performed.

In the write determination only setting a flag is done. If a flag is finally set in the write process, the write process is executed, and the record is deleted. Therefore, if a write flag is not set, the write process is not executed, and a determination function repeats the determination process for the same record.

The process of the wait time control part 108 will now be described.

The wait time control part 108 monitors the data reception status of the data receiving part 102. When an arrival of data delays, the wait time control part 108 determines whether "to wait" or "not to wait" for the data, based on the delay occurrence frequency of individual data.

More specifically, the wait time control part 108 monitors the delay status in data reception, for each collection server apparatus 202. When a data arrival delay occurs, the wait time control part 108 determines whether or not to wait for the un-arrived data in accordance with the monitoring result.

The wait time control part 108 has three types of control schemes as the wait time control scheme for an arrival delay. For each piece of data, the wait time control part 108 can set which control scheme to select.

It may be possible to change the wait time control scheme in the midst of a process. If the control scheme is changed, the decision of "to wait/not to wait" is reset, and all data are to be waited for.

The processing steps of wait time control scheme 1 will be explained with reference to FIG. 16.

The wait time control scheme 1 is a control scheme that determines whether "to wait/not to wait" based on the number of times of consecutive arrival delay occurrence.

In step S1302, the wait time control part 108 determines whether the data received in step S1301 has arrived behind a predetermined appropriate reception timing, that is, whether an arrival delay occurs.

The appropriate reception timing is, for example, the time period identical to the acceptance time starting from the reception time of data which is received first among data which are classified under certain management time.

The appropriate reception timing can be determined by the system administrator arbitrarily.

If data behind the appropriate reception timing exists, then in step S1303, the wait time control part 108 increments the number of times of consecutive delay, for each collection server apparatus 202.

If it is determined in step S1302 that an arrival delay does not occur, then in step S1304, the number of times of consecutive delay of the corresponding collection server apparatus 202 is set to 0.

In step S1305, the wait time control part 108 compares a preset threshold with the number of times of consecutive delay of each collection server apparatus 202. If the number of times of consecutive delay of any one collection server apparatus 202 exceeds the threshold, the wait time control part 108 determines in step S1306 that data from the corresponding collection server apparatus 202 will "not be waited for" any more. The wait time control part 108 notifies the record generating part 105 not to wait for data from the corresponding collection server apparatus 202.

When un-arrived data occurs, if the sender of the un-arrived data is the collection server apparatus 202 notified by the wait time control part 108, the record generating part 105 determines that it will not wait for un-arrived data from the collection server apparatus 202 (S1702 in FIG. 20).

In the determination of S1305, if the number of times of consecutive delay is equal to or smaller than the threshold, the wait time control part 108 determines that data from the corresponding collection server apparatus 202 will "be waited for". The wait time control part 108 notifies the record generating part 105 to wait for the data from the corresponding collection server apparatus 202.

When un-arrived data occurs, if the sender of the un-arrived data is the collection server apparatus 202 notified by the wait time control part 108, the record generating part 105 determines that it will wait for un-arrived data from the corresponding collection server apparatus 202 (S1702 in FIG. 20).

The processing steps of wait time control scheme 2 will be explained with reference to FIG. 17.

The wait time control scheme 2 is a control scheme that determines whether "to wait/not to wait" for data from the collection server apparatus 202 based on the number of times of arrival delay occurring within a predetermined monitor time.

The monitor time is, for example, 10 times the storage period (the width of the management time).

For example, if the management period is 1 minute, the monitor time is 10 minutes.

The duration of the monitor time can be determined by the system administrator arbitrarily.

First, in step S1402, the wait time control part 108 determines whether the data received in step S1401 has arrived behind a predetermined appropriate reception timing, that is, whether an arrival delay occurs.

The meaning of the appropriate reception timing is as described above.

If data behind the appropriate reception timing exists, the wait time control part 108 increments the number of times of delay occurrence by one in step S1403.

In step S1404, the wait time control part 108 determines whether the elapsed time is within the monitor time, that is, whether or not the monitor time is ended. If the monitor time is not ended (YES in S1404), the flow returns to data reception of S1401.

If the elapsed time exceeds the monitor time (NO in S1404), that is, if the monitor time is ended, then in step S1405, the wait time control part 108 determines whether or not the number of times of delay occurrence within the monitor time exceeds the preset threshold, for each collection server apparatus 202.

If the number of times of delay occurrence of any one collection server apparatus 202 exceeds the threshold, the wait time control part 108 determines in step S1407 that data from the corresponding collection server apparatus 202 will "not be waited for" any more. The wait time control part 108 notifies the record generating part 105 not to wait for data from the corresponding collection server apparatus 202.

When un-arrived data occurs, if the sender of the un-arrived data is the collection server apparatus 202 notified by the wait time control part 108, the record generating part 105 determines that it will not wait for un-arrived data coming from the collection server apparatus 202 (S1702 in FIG. 20).

If the number of times of delay occurrence is equal to or smaller than the threshold in the determination of S1405, then in step S1406, both the number of times of delay occurrence and the monitor time are reset to zero, and counting of the number of times of delay occurrence and measurement of the monitor time are resumed.

If the number of times of delay occurrence is equal to or smaller than the threshold in the determination of S1405, the wait time control part 108 determines that data from the corresponding collection server apparatus 202 will "be waited for". The wait time control part 108 notifies the record generating part 105 to wait for data from the corresponding collection server apparatus 202.

When un-arrived data occurs, if the sender of the un-arrived data is the collection server apparatus 202 notified by the wait time control part 108, the record generating part 105 determines that it will wait for un-arrived data coming from the corresponding collection server apparatus 202 (S1702 in FIG. 20).

The processing steps of wait time control scheme 3 will be explained with reference to FIG. 18.

The wait time control scheme 3 is a control scheme that determines whether "to wait/not to wait" for data from the collection server apparatus 202 based on the average delay time (the average value of the delay time) occurring within the monitor time.

The meaning of the monitor time is as described above.

In step S1502, the wait time control part 108 determines whether the data received in step S1501 has arrived behind a predetermined appropriate reception timing, that is, whether an arrival delay occurs.

The meaning of the appropriate reception timing is as described above.

If data behind the appropriate reception timing exists, then in step S1503, the wait time control part 108 measures the delay time behind the appropriate reception timing, and stores the measured delay time.

In step S1504, the wait time control part 108 determines whether the elapsed time is within the monitor time, that is, whether or not the monitor time is ended. If the monitor time is not ended (YES in S1504), the flow returns to data reception of step S1501.

If the elapsed time exceeds the monitor time (NO in S1504), that is, if the monitor time is ended, then in step S1505, the wait time control part 108 calculates the average value of the delay time within the monitor time for each collection server apparatus 202, and determines whether or not the calculated average value exceeds the preset threshold.

If the average value of the delay time of any one collection server apparatus 202 exceeds the threshold, the wait time control part 108 determines in step S1507 that data from the corresponding collection server apparatus 202 will "not be waited for" any more. The wait time control part 108 notifies the record generating part 105 not to wait for data from the corresponding collection server apparatus 202.

When un-arrived data occurs, if the sender of the un-arrived data is the collection server apparatus 202 notified by the wait time control part 108, the record generating part 105 determines that it will not wait for un-arrived data coming from the corresponding collection server apparatus 202 (S1702 in FIG. 20).

If the number of times of delay occurrence is equal to or smaller than the threshold in the determination of S1505, then in step S1506, both the delay time and the monitor time are reset to zero, and measurement of the delay time and measurement of the monitor time are resumed.

If the average value of the delay time is equal to or smaller than the threshold in the determination of S1505, the wait time control part 108 determines that data from the corresponding collection server apparatus 202 will "be waited for". The wait time control part 108 notifies the record generating part 105 to wait for data from the corresponding collection server apparatus 202.

When un-arrived data occurs, if the sender of the un-arrived data is the collection server apparatus 202 notified by the wait time control part 108, the record generating part 105 determines that it will wait for un-arrived data from the corresponding collection server apparatus 202 (S1702 in FIG. 20).

Figure 16:
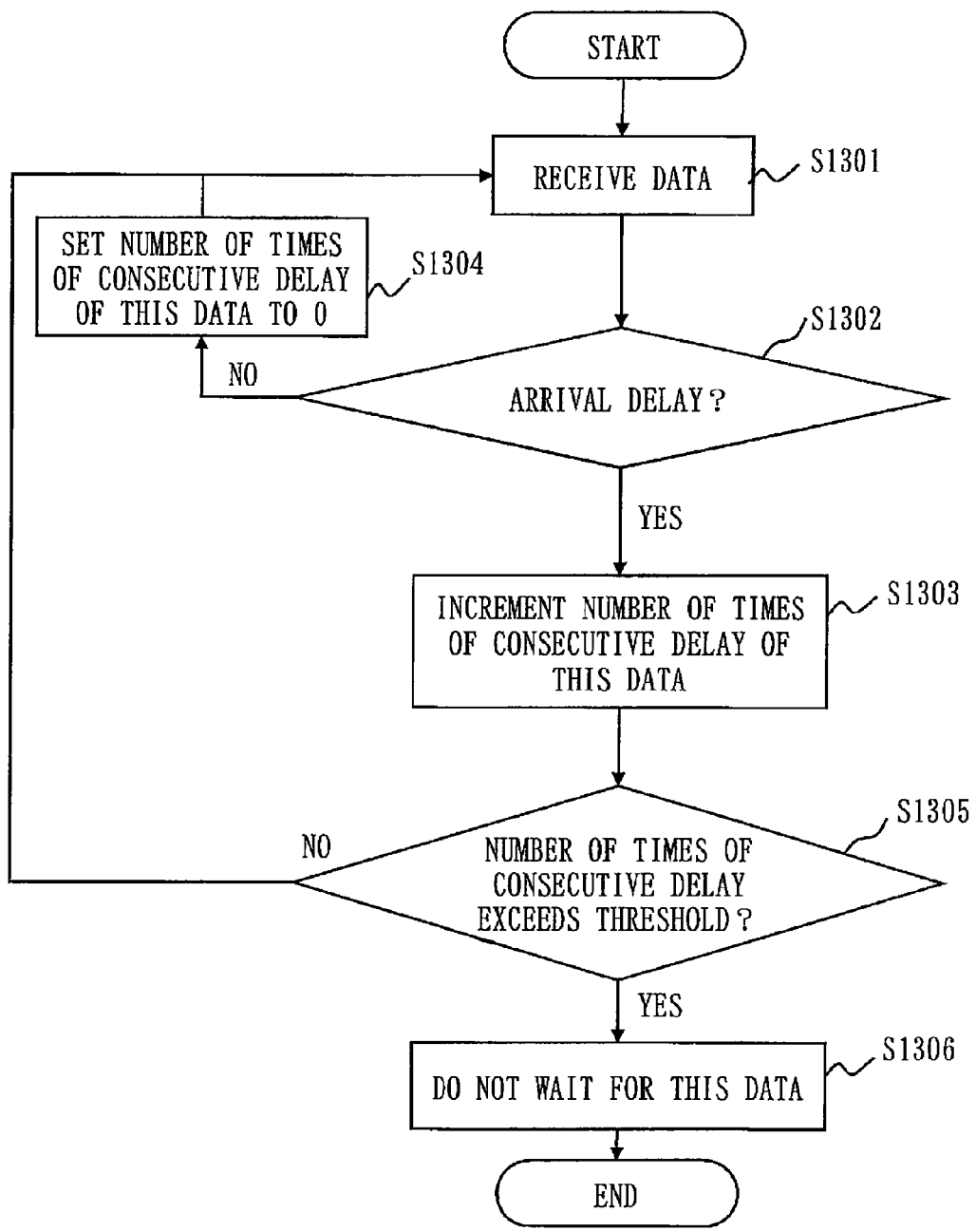
FIG. 16 is a flowchart showing a processing flow of a wait time control scheme according to Embodiment 1.
Figure 17:
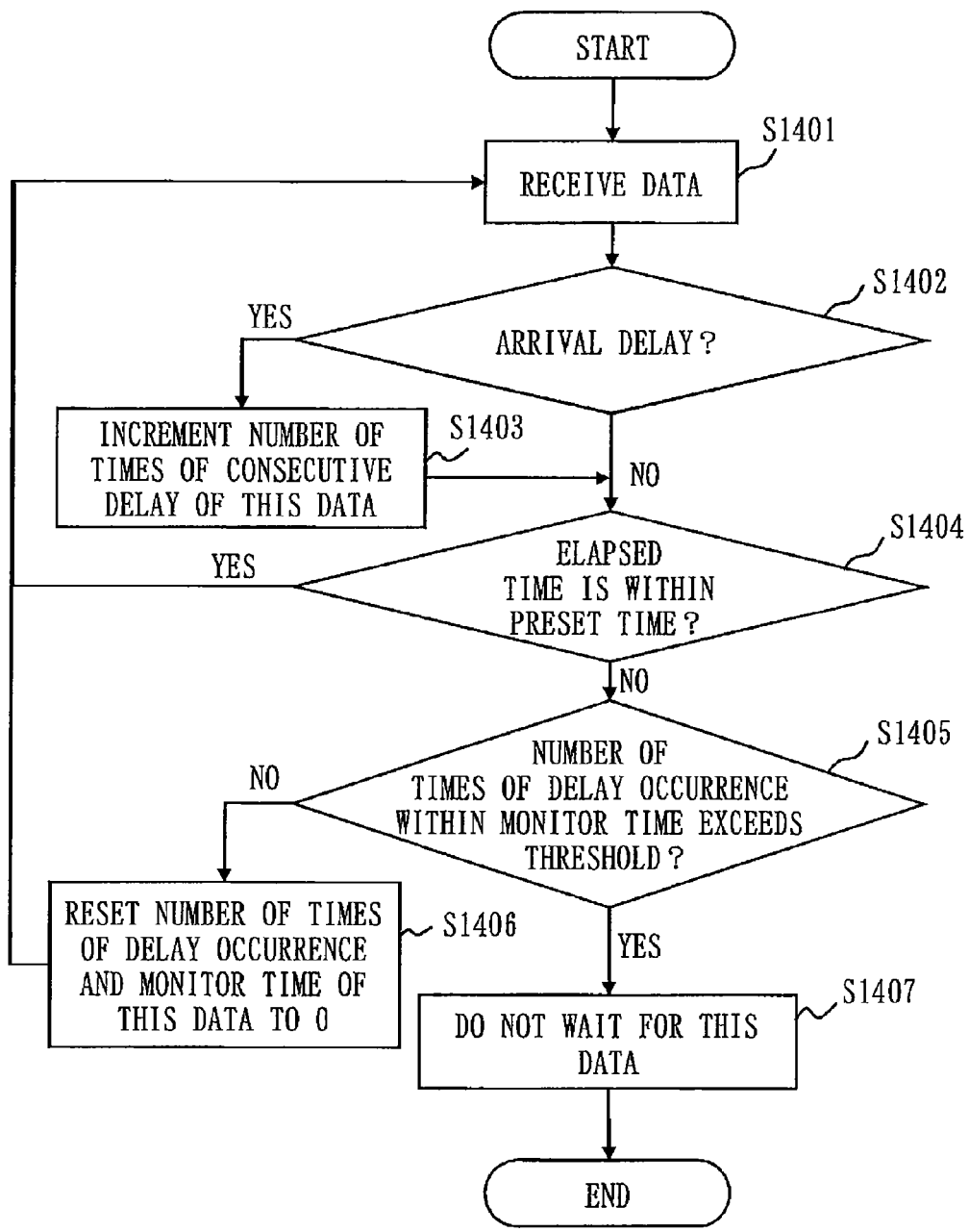
FIG. 17 is a flowchart showing the processing flow of the wait time control scheme according to Embodiment 1.
Figure 18:
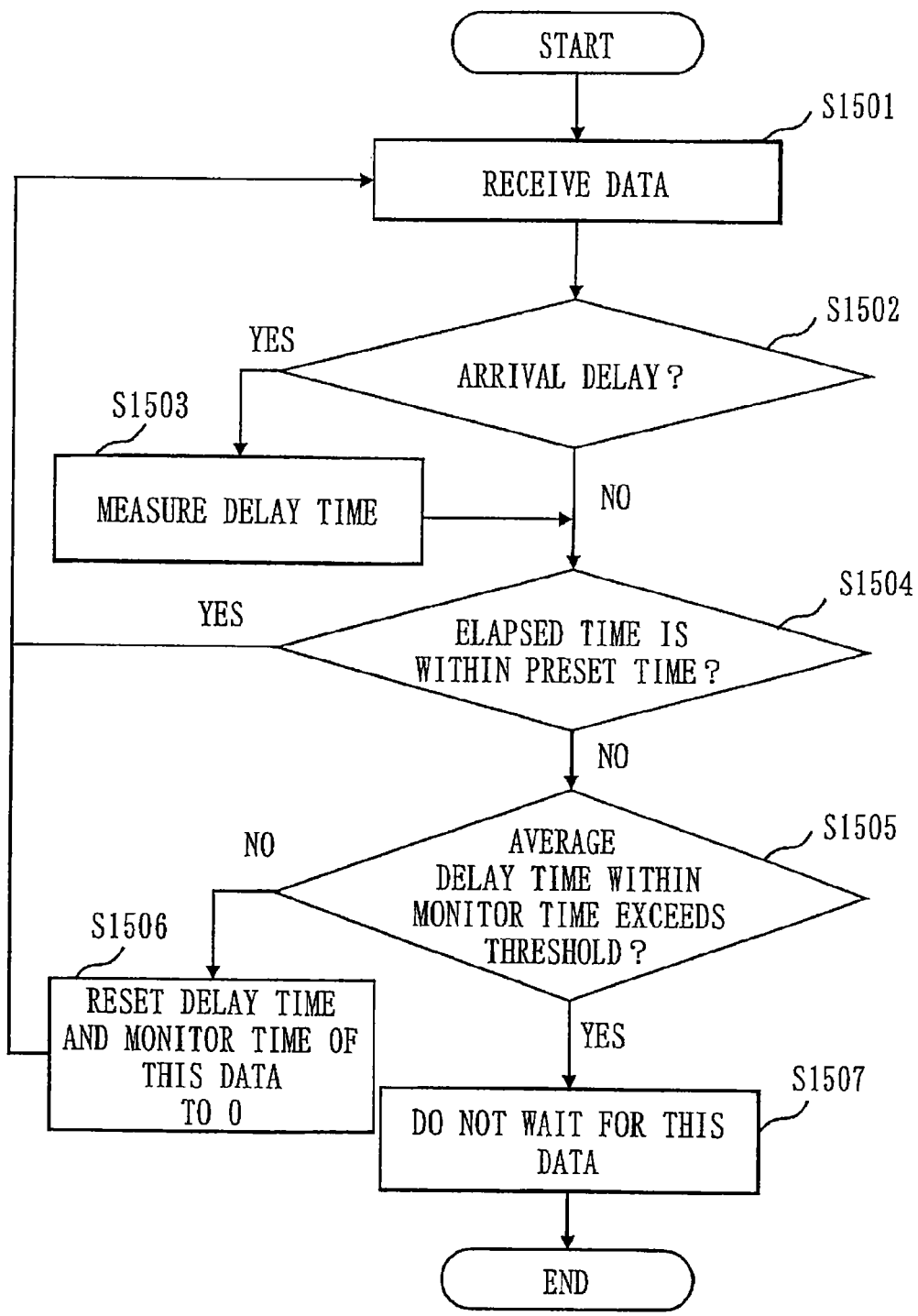
FIG. 18 is a flowchart showing the processing flow of the wait time control scheme according to Embodiment 1.

In the explanations of the respective schemes of FIGS. 16 to 18, the data reception status of each collection server apparatus 202 is monitored, and whether to wait for un-arrived data is determined for each collection server apparatus 202 in accordance with the system in which the collection server apparatus 202 transmits data from the plurality of measuring device 201 altogether to the database server apparatus 100, as shown by the configuration of FIG. 1.

However, the wait time control part 108 may monitor the reception status of each measuring device 201 (each data), and determine whether to wait for un-arrived data for each measuring device 201 (each un-arrived data), for the system in which the database server apparatus 100 receives data from each measuring device 201 directly, or the system in which the collection server apparatus 202 receives data from the measuring devices 201 and transfers each received data to the database server apparatus 100 separately instead of sending data from the plurality of measuring device 201 altogether.

In the scheme with which whether to wait for un-arrived data is determined for each measuring device 201 (each data), the measuring device 201 is an example of a data transmission apparatus.

In the explanations of the respective schemes of FIGS. 16 to 18, the wait time control part 108 compares the number of times of consecutive delay, the number of times of delay occurrence, and the average delay time, with the respective thresholds, and determines whether to wait for data.

Alternatively, when the number of times of consecutive delay, the number of times of delay occurrence, and the average delay time are derived, the wait time control part 108 may notify them to the record generating part 105. The record generating part 105 may compare the number of times of consecutive delay, the number of times of delay occurrence, and the average delay time, with the respective thresholds, and may determine whether to wait for data.

A method will be described hereinafter which is to make the record management scheme described so far, applicable to addition, elimination, and change of the measuring device.

According to the record management scheme descried so far, since a device corresponds to data uniquely, as in the record shown in FIG. 2, when the device is changed, it is difficult to cope with the change.

In order to solve this problem, according to this embodiment, the configuration information managing part 104 is provided.

FIG. 10 shows an example of definition for an electric power sensor or temperature sensor installed in a building.

FIG. 11 shows explanations of the respective items indicated in FIG. 10.

Although FIGS. 10 and 11 are directed to a building, the definition can apply if the electric power sensor or temperature sensor is installed at a location other than in a building.

A sensor identifier 901 serves to identify the sensor and should be unique in a system.

Table information 902 defines the identifier of a table where information of the sensor is to be written.

Record information 903 indicates in which column of a record the data measured by the sensor is stored.

Position information 904 defines information on the position where the sensor is installed.

Data type information 905 defines information on the measurement value.

If a building is concerned, the position information 904 includes a building ID 906 uniquely identifying a building, and a floor ID 907 indicating on which floor of the building the sensor is installed.

If the floor needs to be subdivided, for example, an area ID 908 or the like is defined.

Electric power can be divided into an air-conditioning purpose or illumination purpose, therefore, it is possible to define a purpose ID 909, a device ID 910 indicating which distribution switchboard the measured electric power value concerns, and the like.

All data to be stored in the record are numerical values. However, it is difficult to anticipate every data type in advance including addition of a sensor.

Hence, according to this embodiment, all data are stored as an integer value of, for example, 64-bit type, the data category is defined by data category 911, and the precision such as the number of decimal places of the data is defined by data type 912, so that any data can be stored.

Examples in FIGS. 10 and 11 are for a numerical value. However, a usable value is not limited to numerical value.

Separating device information from record definition in the above manner, can cope with changes on the device configuration.

When the device is changed during system operation due to a device breakdown or the like, this change can be coped with by changing the configuration information.

Figure 12:
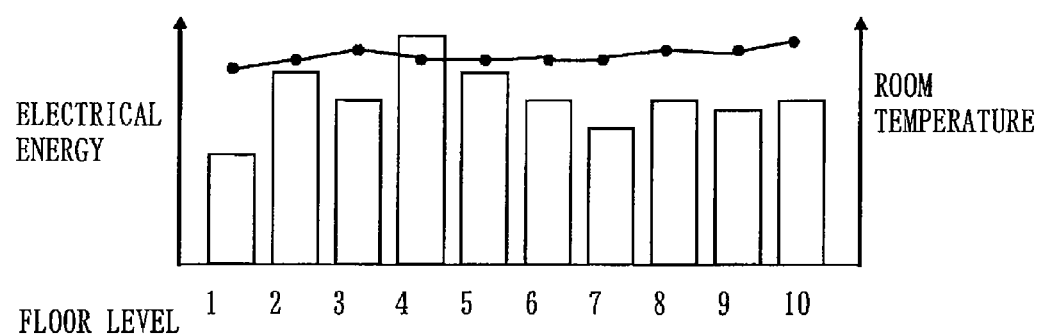
FIG. 12 is a graph showing a totaling example of sensor data according to Embodiment 1.
Figure 13:
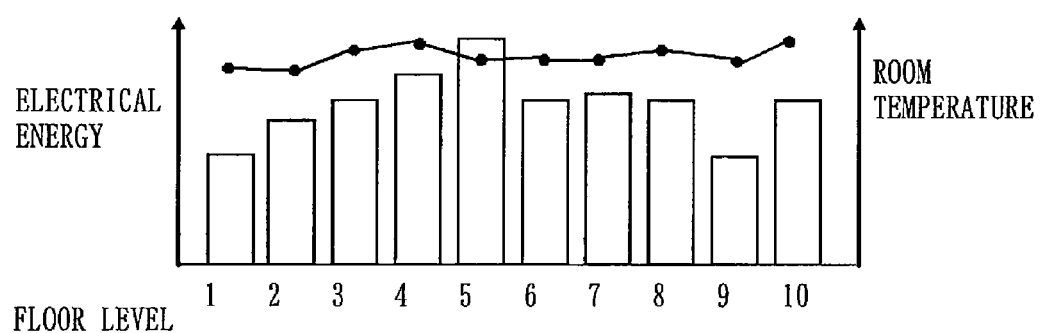
FIG. 13 is a graph showing a totaling example of sensor data according to Embodiment 1.

FIGS. 12 and 13 show totaling examples of sensor data managed by the record described above.

FIG. 12 shows the total amount of electrical energy of each floor of a building 1 and the average value of the room temperature. FIG. 13 shows the total amount of electrical energy of each floor of a building 2 and the average value of the room temperature.

In FIGS. 12 and 13, the bar graph represents the electrical energy, and the line graph represents the temperature.

The information of the respective sensors is not managed during record generation. By referring to the definition of the configuration information during totaling, the values can be totaled in different axes.

As described above, according to this embodiment, data missing can be suppressed as much as possible based on a process time anticipated when writing and on a delay time set by the user, so that the process can be performed that does not degrade the write process performance.

According to this embodiment, even if data arrives with some delay, the data arrived with the delay can be stored in the record because of a wait time. As a result, the missing data occurrence frequency can be suppressed.

The accumulated data may be utilized for periodical monitoring (for example, the room temperature may be collected/accumulated, and the data on the room temperature may be extracted at constant intervals) or the like. In order to prevent a degradation in search performance, it is necessary to minimize the number of times of writing and to write data having a size as large as possible in one write operation.

According to this embodiment, the collected data can be written in the table in the real-time manner while controlling the trade-off (the trade-off between the search performance and delay time).

As a result, the above problem can be avoided.

In fine, the delay time can be shortened without degrading the search performance.

So far, in this embodiment a record generation function of storing a plurality of pieces of inputted data in one record has been described which has:

(1) a simultaneity determining function of determining record storing time from the time stamp of received data, (2) a wait time control function of delaying record write, when an arrival delay occurs for individual data, determining whether "to wait/not to wait" for individual data until the data arrives, and storing the data in a corresponding record, and (3) a write determining function of determining whether to write a generated record in a table; and (4) a step of determining whether the individual data are generated at the same time, (5) a step of determining whether "to wait/not to wait" for data arriving with a delay, (6) a step of storing data generated at the same time, in the same record, and (7) a step of determining whether to write the stored record in the table.

Also, it has been described that the record generation function according to this embodiment includes the simultaneity determining function of determining the date and time of a record which is the storing target by threshold processing the difference between the date and time (the record's date and time) set by the record generation period and the time stamp added to the data, based on the storing period, if a record with record's date and time that should be stored does not exist, generating a record and adding the date to the record, and if a record with record's date and time that should be stored exists, reading the record from a storage device.

Also, it has been described that the simultaneity determining function according to this embodiment determines whether a time stamp added to data coincides with reference time related to the storage period, by subjecting the difference between the time stamp and the reference time to round-off, round-up, round-down, or the like.

Also, it has been described that the record generation function according to this embodiment includes the wait time control function of determining whether "to wait/not to wait" for individual data according to the selected wait time control scheme, storing data determined "to be waited for" in a corresponding record when the data arrives within an allowable wait time, storing data arriving behind the allowable wait time, by generating a record having time and date which is the same as that of the record which should originally be stored, redundantly, executing wait time control also for the data arriving behind the allowable wait time, and concerning data which has already arrived, or does not arrive within the wait time because of a further delay, storing a NULL value in a corresponding column.

Also, it has been described that the wait time control function according to this embodiment, in a wait time control scheme which determines whether to wait for data arriving with a delay based on the number of times data does not arrive within a wait time, determines "to wait" for data not arriving within the wait time consecutively a number of times not exceeding a predetermined threshold, and determines "not to wait" for data not arriving within the wait time consecutively a number of times exceeding the predetermined threshold.

Also, it has been described that the wait time control function according to this embodiment, in a wait time control scheme which determines whether to wait for data arriving with a delay based on the delay occurrence frequency within a predetermined time, determines "to wait" for data arriving with a delay within a preset time a number of times equal to or smaller than a preset threshold, and determines "not to wait" for data arriving with a delay within the preset time a number of times exceeding the preset threshold.

Also, it has been described that the wait time control function according to this embodiment, in a wait time control scheme which determines whether to wait for data arriving with a delay based on an average delay time within a predetermined time, determines "to wait" for data arriving with an average delay time, equal to or shorter than a preset threshold, of arrival delay occurring within a preset predetermined time, and determines "not to wait" for data arriving with the average delay time, exceeding the preset threshold, of arrival delay occurring within the preset predetermined time.

Also, it has been described that the record generation function according to this embodiment has a write determining function of determining whether or not to write in all records to be stored in the storage device, which write determining function including calculating an elapsed time, starting at generation date and time, based on current time and the date and time of every record at which the record is newly generated, determining whether a record exists which is to be subjected to a write process, based on the elapsed time, the record size, and the table write process time, and setting a write flag for a record which is to be subjected to the write process.

Also, it has been described that the write determining function according to this embodiment, when a record determined to be subjected to the write process, based on the wait time, exists among records to be stored in the storage device, sets a write flag for all records each having complete data, and sets a write flag for only a record for which the wait time has elapsed, among records that are incomplete because of a data arrival delay.

Also, according to this embodiment, in a record generation function of storing a plurality of inputted pieces of data, in one record, a configuration information managing function has been described which includes a function of managing configuration information such as the installation location of a data measuring device, and managing a data format, and a configuration information managing function having a step of determining in which record the data is to be stored.

Also, it has been described that the configuration information managing function according to this embodiment manages the installation location of a data measuring device, in the form of a hierarchical structure (for example, floor, area, device, or purpose), manages an in-record item number under which data of each measuring device is to be stored, specifies a NULL value and a precision in data of each measuring device, specifies whether to set a wait time, and changes management information, when the configuration changes (addition, elimination, and change of a measuring device), so the management information is reflected in the system.

Finally, a hardware configuration of the database server apparatus 100 shown in this embodiment will be described.

Figure 21:
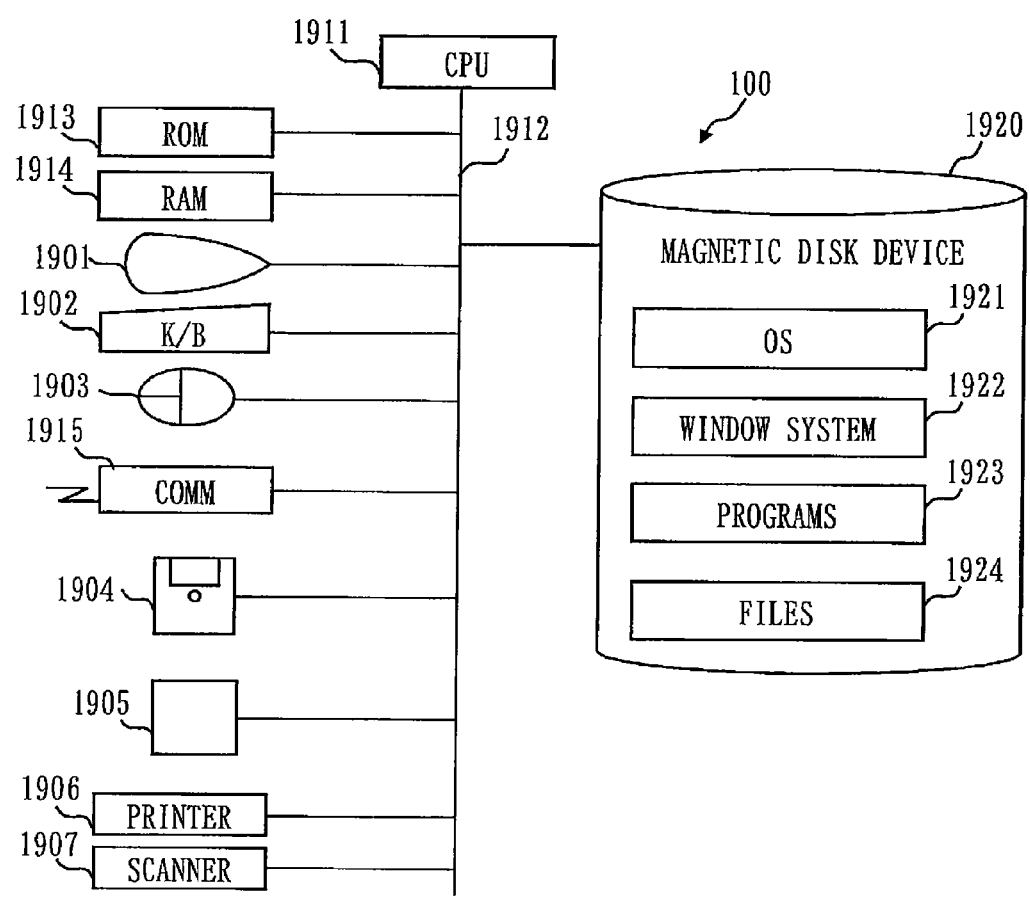
FIG. 21 is a diagram showing a hardware configuration of the database server apparatus according to Embodiment 1.

FIG. 21 shows an example of the hardware resource of the database server apparatus 100 according to this embodiment.

Note that the configuration of FIG. 21 is merely an example of the hardware configuration of the database server apparatus 100. The hardware configuration of the database server apparatus 100 is not limited to that shown in FIG. 21, but another configuration may also be possible.

Referring to FIG. 21, the database server apparatus 100 includes a CPU 1911 (also referred to as a Central Processing Unit, central processing device, processing device, computation device, microprocessor, microcomputer, or processor) that executes programs.

The CPU 1911 is connected to, for example, a ROM (Read Only Memory) 1913, a RAM (Random Access Memory) 1914, a communication board 1915, a display device 1901, a keyboard 1902, a mouse 1903, and a magnetic disk device 1920 via a bus 1912, and controls these hardware devices.

Furthermore, the CPU 1911 may be connected to an FDD 1904 (Flexible Disk Drive), a compact disk device 1905 (CDD), a printer device 1906, or a scanner device 1907. In place of the magnetic disk device 1920, a storage device such as an optical disk device or memory card (registered trademark) read/write device may be employed.

The RAM 1914 is an example of a volatile memory. The storage media, namely the ROM 1913, FDD 1904, CDD 1905, and magnetic disk device 1920, are examples of a nonvolatile memory. These devices are examples of the storage device or storage part.

The "storage part" described in this embodiment is implemented by the RAM 1914, magnetic disk device 1920, or the like.

The communication board 1915, keyboard 1902, mouse 1903, scanner device 1907, FDD 1904, and the like are examples of an input device.

The communication board 1915, display device 1901, printer device 1906, and the like are examples of an output device.

The communication board 1915 is connected to a network, as shown in FIG. 1.

For example, communication board 1915 may be connected to a LAN (Local Area Network), the Internet, a WAN (Wide Area Network), or a SAN (Storage Area Network).

The magnetic disk device 1920 stores an operating system 1921 (OS), a window system 1922, programs 1923, and files 1924.

The CPU 1911 executes each program of the programs 1923 by utilizing the operating system 1921 and the window system 1922.

The RAM 1914 temporarily stores at least some programs of the operating system 1921 and application programs that are executed by the CPU 1911.

The RAM 1914 also stores various types of data necessary for the process performed by the CPU 1911.

The ROM 1913 stores a BIOS (Basic Input Output System) program. The magnetic disk device 1920 stores a boot program.

When booting the database server apparatus 100, the BIOS program of the ROM 1913 and the boot program of the magnetic disk device 1920 are executed. The BIOS program and boot program boot the operating system 1921.

The programs 1923 include a program that executes the function described as a "part" (except for the "storage part"; the same applies to the following) or "function" in this embodiment. The program is read and executed by the CPU 1911.

The files 1924 store information, data, signal values, variable values, and parameters indicating the results of the processes described as "determining", "classifying", "calculating", "deriving", "comparing", "writing", "storing", "updating", "setting", "registering", "selecting", and the like in the description of this embodiment, as the items of "files" and "databases".

The "files" and "databases" are stored in a recording medium such as a disk or memory. The information, data, signal values, variable values, and parameters stored in the storage medium such as the disk or memory are read out to the main memory or cache memory by the CPU 1911 through a read/write circuit, and are used for the operations of the CPU such as extraction, search, look-up, comparison, computation, calculation, process, edit, output, print, and display.

During the operations of the CPU including extraction, search, look-up, comparison, computation, calculation, process, edit, output, print, and display, the information, data, signal values, variable values, and parameters are temporarily stored in the main memory, register, cache memory, buffer memory, or the like.

The arrows in the flowcharts described in this embodiment mainly indicate input/output of data and signals. The data and signal values are stored in a recording medium such as: the memory of the RAM 1914, the flexible disk of the FDD 1904, the compact disk of the CDD 1905, or the magnetic disk of the magnetic disk device 1920; or an optical disk, mini disk, or DVD. The data and signals are transmitted online via the bus 1912, a signal line, a cable, or another transmission medium.

The "part" and "function" in the description of this embodiment may be a "circuit", "device", or "equipment"; or a "step", "procedure", or "process".

Namely, the steps, procedures, and processes shown in the flowcharts described in this embodiment can implement the "data processing method" according to the present invention.

The "part" and "function" may be implemented as the firmware stored in the ROM 1913. Alternatively, the "part" and "function" may be practiced by only software; by only hardware such as an element, a device, a substrate, or a wiring line; by a combination of software and hardware; or furthermore by a combination of software, hardware, and firmware. The firmware and software are stored, as programs, in a recording medium such as a magnetic disk, flexible disk, optical disk, compact disk, mini disk, or DVD. The program is read by the CPU 1911 and executed by the CPU 1911. In other words, the program causes the computer to function as the "part" or "function" of this embodiment. Alternatively, the program causes the computer to execute the procedure and method of the "part" or "function" of this embodiment.

In this manner, the database server apparatus 100 indicated in this embodiment is a computer comprising a CPU being a processing device; a memory, magnetic disk, and the like each being a storage device; a keyboard, mouse, communication board, and the like each being an input device; and a display device, communication board, and the like each being an output device. The functions expressed as the "parts" and "functions" are implemented by using these processing device, storage device, input device, and output device, as described above.

REFERENCE SIGNS LIST

100: database server apparatus; 101: data; 102: data receiving part; 103: time determining part; 104: configuration information managing part; 105: record generating part; 106: write processing part; 107: write determining part; 108: wait time control part; 109: table storing part; 110: configuration information storing part; 201: measuring device; 202: collection server apparatus; 204: network; 205: network

The invention claimed is:

1. A data processing apparatus which manages a record based on a plurality of management time periods each having a predetermined width, comprising:
   a data receiver that receives a plurality of pieces of data from a plurality of data transmission apparatuses, the pieces of data having been transmitted by the plurality of data transmission apparatuses periodically according to a predetermined period, the pieces of received data each including a time stamp indicating time;
   a time determining part which, each time the data receiver receives a piece of data, determines the management time period in the plurality of management time periods that corresponds to the time of the time stamp in the received piece of data based on the predetermined width of the management time period, and classifies the received piece of data under the determined management time period;

a record generating part that generates a record by arranging a first piece of data, which is classified by the time determining part under the determined management time period and which is inputted from the time determining part during a predetermined acceptance time since a start of input of data classified under the determined management time period, adds to the record a second piece of data classified under the determined management time period and inputted from the time determining part after an end of an acceptance time period and before an end of a wait time, and if a piece of data from one or more of the plurality of data transmission apparatuses has not been inputted yet at the end of the wait time, determines that an un-arrived data exists, and adds a value representing the existence of the un-arrived data to the record, and completes generation of the record; and a table adding part that receives the record completely generated from the record generation part, and adds the record completely generated by the record generation part, to a predetermined table, wherein the record generating part, when the un-arrived data exists, determines whether or not to wait for input of the un-arrived data at the end of the acceptance time based on predetermined configuration data, if input of the un-arrived data is determined to be waited for, the record generating part waits for input of the un-arrived data during the wait time, and if input of the un-arrived data is determined not to be waited for, the record generating part adds the value representing the existence of the un-arrived data to the record at the end of the acceptance time, the data receiver receives data transmitted from the plurality of data transmission apparatuses at every predetermined period, the data processing apparatus further comprises a delay status monitoring part which monitors a delay status of data reception based on the data that the data receiver receives from the plurality of data transmission apparatuses for each of the data transmission apparatuses, and the record generation part, if the un-arrived data exists, determines whether or not to wait for input of the un-arrived data based on a monitoring result of the delay status monitoring part for a data transmission apparatus which is a sender of the un-arrived data.

2. The data processing apparatus according to claim 1, wherein the record generating part, if data classified under a previous management time period is inputted, with a delay, from the time determining part, generates a record of delay data inputted with the delay, and completes generation of the record, and the table adding part adds the record that describes the delay data and that is completely generated by the record generating part, to the table.

3. The data processing apparatus according to claim 1, wherein the delay status monitoring part counts the number of times data is received behind an appropriate reception timing consecutively, as a number of times of consecutive delay, for each of the data transmission apparatuses, and wherein the record generating part, if the number of times of consecutive delay of a data transmission apparatus, being the sender of the un-arrived data, is equal to or smaller than a predetermined threshold, waits for input of the un-arrived data, and if the number of times of consecutive delay of the data transmission apparatus, being the sender of the un-arrived data, exceeds the threshold, does not wait for input of the un-arrived data.

4. The data processing apparatus according to claim 1, wherein the delay status monitoring part counts a number of times data is received behind an appropriate reception timing within a predetermined monitor period, as a number of times of delay occurrence, for each of the data transmission apparatuses, and wherein the record generating part, if the number of times of delay occurrence of a data transmission apparatus, being the sender of the un-arrived data, is equal to or smaller than a predetermined threshold, waits for input of the un-arrived data, and if the number of times of delay occurrence of the data transmission apparatus, being the sender of the un-arrived data, exceeds the threshold, does not wait for input of the un-arrived data.

5. The data processing apparatus according to claim 1, wherein the delay status monitoring part, each time data is received behind an appropriate reception timing, measures a delay time behind the appropriate reception timing, and calculates an average value of the measured delay time within a predetermined monitoring period for each of the data transmission apparatuses, and wherein the record generating part, if the average value of the delay time of a data transmission apparatus, being the sender of the un-arrived data, is equal to or smaller than a predetermined threshold, waits for input of the un-arrived data, and if the average value of the delay time of the data transmission apparatus, being the sender of the un-arrived data, exceeds the threshold, does not wait for input of the un-arrived data.

6. The data processing apparatus according to claim 1, wherein the record generating part, if a plurality of un-arrived data exist, determines whether or not to wait for input of each of the un-arrived data.

7. The data processing apparatus according to claim 1, wherein the record generating part, if all data classified under a current record target management time are stored in the record by the end of the acceptance time, completes generation of the record without waiting for the end of the acceptance time.

8. The data processing apparatus according to claim 1, wherein the table adding part, if generation of a record by the record generating part is completed before the end of the wait time, adds the completely generated record to the table without waiting for the end of the wait time.

9. The data processing apparatus according to claim 1, wherein the time determining part, each time data is received by the data receiver, determines management time corresponding to time of a time stamp added to the received data, by executing any one operation of round-up, round-off, and round-down of the time of the time stamp.

10. The data processing apparatus according to claim 1, wherein the data receiver receives data indicating a measurement value measured by each of a plurality of measuring devices, to be related to device ID (Identification) of a measuring device, wherein the data processing apparatus further includes a configuration information storing part which stores configuration information that designates a position of data in a record, for each device ID, and wherein the record generating part generates a record by arranging data classified under a current record target management time, at positions designated by the configuration information, based on the device ID related to the data inputted from the time determining part.

11. The data processing apparatus according to claim 10, wherein the data receiver receives data indicating a measurement value measured by each of a plurality of measuring devices installed at a plurality of locations, and
wherein the configuration information storing part stores configuration information representing at least one of: an installation location of a measuring device; an attribute of the measurement value; and a precision of the measurement value, for each device ID.

12. The data processing apparatus according to claim 1, wherein the data receiver receives the plurality of pieces of data from the plurality of data transmission apparatuses via a communication network that is subject to congestion so that a reception of one or more of the pieces of data is delayed more than a reception of another one or more pieces of data.

13. The data processing apparatus according to claim 1, wherein a duration of the acceptance time period is equal to half of the predetermined width of each management time period.

14. A data processing method executed by a computer that manages a record based on a plurality of management time periods each having a predetermined width, the method comprising:
receiving, by the computer, pieces of data from a plurality of data transmission apparatuses, the pieces of data having been transmitted by the plurality of data transmission apparatuses periodically according to a predetermined period, the received pieces of data each including a time stamp indicating time;
each time a piece of data is received, determining, by the computer, the management time period in the plurality of management time periods that corresponds to the time of the time stamp in the received piece of data, and classifying the received piece of data under the determined management time;
generating a record by arranging a first piece of data, which is classified under the determined management time period and which is received during a predetermined acceptance time since a start of reception of data classified under the determined management time period;
adding to the record a second piece of data classified under the determined management time period and received after an end of the predetermined acceptance time; and before an end of a predetermined wait time;
if a piece of data from one or more of the plurality of data transmission apparatuses has not been received yet at the end of the wait time, determining that an un-arrived data exists, and adding a value representing the existence of the un-arrived data to the record, and completing generation of the record;
adding the record completely generated, to a predetermined table, wherein
when the un-arrived data exists, determining whether or not to wait for input of the un-arrived data at the end of the acceptance time based on predetermined configuration data,
if input of the un-arrived data is determined to be waited for, waiting for input of the un-arrived data during the wait time, and if input of the un-arrived data is determined not to be waited for, adding the value representing the existence of the un-arrived data to the record at the end of the acceptance time;
receiving data transmitted from the plurality of data transmission apparatuses at every predetermined period; and monitoring a delay status of data reception based on the data received from the plurality of data transmission apparatuses for each of the data transmission apparatuses, wherein
if the un-arrived data exists, determining whether or not to wait for input of the un-arrived data based on a monitoring result of the delay status for a data transmission apparatus which is a sender of the un-arrived data.

15. The method according to claim 14, further comprising:
receiving the plurality of pieces of data from the plurality of data transmission apparatuses via a communication network that is subject to congestion so that a reception of one or more of the pieces of data is delayed more than a reception of another one or more pieces of data.

16. The method according to claim 14, wherein a duration of the acceptance time period is equal to half of the predetermined width of each management time period.

17. A non-transitory computer readable medium which causes a computer that manages a record based on management time of a predetermined width, to execute:
a data reception process of receiving pieces of data from a plurality of data transmission apparatuses, the pieces of data having been transmitted by the plurality of data transmission apparatuses periodically according to a predetermined period, the received pieces of data each including a time stamp indicating time;
a time determining process of determining, each time a piece of data is received, the management time period in the plurality of management time periods that corresponds to the time of the time stamp in the received piece of data, and classifying the received piece of data under the determined management time;
a record generating process of generating a record by arranging a first piece of data, which is classified under the determined management time period and which is received during a predetermined acceptance time since a start of reception of data classified under the determined management time period; adding to the record a second piece of data classified under the determined management time period and received after an end of the predetermined acceptance time; and before an end of a predetermined wait time, and if a piece of data from one or more of the plurality of data transmission apparatuses has not been received yet at the end of the wait time, determining that an un-arrived data exists, and adding a value representing the existence of the un-arrived data to the record, and completing generation of the record;
a table adding process of adding the record completely generated by the record generation process, to a predetermined table, wherein
the record generating process includes, when the un-arrived data exists, determining whether or not to wait for input of the un-arrived data at the end of the acceptance time based on predetermined configuration data,
if input of the un-arrived data is determined to be waited for, the record generating process includes waiting for input of the un-arrived data during the wait time, and if input of the un-arrived data is determined not to be waited for, the record generating process includes adding the value representing the existence of the un-arrived data to the record at the end of the acceptance time,
the data reception process includes receiving data transmitted from the plurality of data transmission apparatuses at every predetermined period; and
a delay status monitoring process of monitoring a delay status of data reception based on the data received from the plurality of data transmission apparatuses for each of the data transmission apparatuses, wherein the record generation process includes, if the un-arrived data exists, determining whether or not to wait for input of the un-arrived data based on a monitoring result of the delay status monitoring process for a data transmission apparatus which is a sender of the un-arrived data.

18. The medium according to claim 17, further causes the computer to execute the data reception process of receiving the plurality of pieces of data from the plurality of data transmission apparatuses via a communication network that is subject to congestion so that a reception of one or more of the pieces of data is delayed more than a reception of another one or more pieces of data.

19. The medium according to claim 17, wherein a duration of the acceptance time period is equal to half of the predetermined width of each management time period.

* * * * *